US011689637B2

(12) United States Patent
Soloway et al.

(10) Patent No.: US 11,689,637 B2
(45) Date of Patent: Jun. 27, 2023

(54) LOCAL CACHE MANAGEMENT IN EDGE NETWORKS

(71) Applicant: QUALCOMM Incorporated, San Diego, CA (US)

(72) Inventors: Alan Soloway, Erie, CO (US); Edward Robert Hall, Bristol (GB); Tom Chin, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/069,612

(22) Filed: Oct. 13, 2020

(65) Prior Publication Data

US 2021/0112137 A1  Apr. 15, 2021

Related U.S. Application Data

(60) Provisional application No. 62/914,857, filed on Oct. 14, 2019.

(51) Int. Cl.
  *G06F 15/16* (2006.01)
  *H04L 67/5682* (2022.01)
  *H04L 67/289* (2022.01)
  *H04L 67/145* (2022.01)

(52) U.S. Cl.
  CPC ........ *H04L 67/5682* (2022.05); *H04L 67/145* (2013.01); *H04L 67/289* (2013.01)

(58) Field of Classification Search
  CPC .. H04L 67/2852; H04L 67/145; H04L 67/289
  USPC ........................................................ 709/201
  See application file for complete search history.

(56) References Cited

U.S. PATENT DOCUMENTS 6,141,705 A * 10/2000 Anand ................ H04L 63/1458
                                                  718/107
6,539,445 B1 * 3/2003 Krum .................... H04L 12/403
                                                  710/110
6,883,170 B1 * 4/2005 Garcia ................ G06F 11/1482
                                                  718/1

(Continued)

FOREIGN PATENT DOCUMENTS

WO  WO-2019127327 A1  7/2019

OTHER PUBLICATIONS

International Search Report and Written Opinion—PCT/US2020/055573—ISA/EPO—dated Dec. 1, 2020.

*Primary Examiner* — Alicia Baturay
(74) *Attorney, Agent, or Firm* — Holland & Hart LLP

(57) ABSTRACT

Methods, systems, and devices for wireless communications are described that provide for establishment and maintenance of edge data network services. A user equipment (UE) may register one or more application clients for edge services at an edge application server. In order to maintain edge application servers that are continuing to be used by the UE, an edge enabler server at the edge data network, an edge enabler client at the UE, or both, may initiate a timer that is used to confirm the edge application server is continuing to be used. Such techniques may help prevent resources from being consumed after the edge services are no longer needed, such as after the UE no longer needs the edge services or the UE has moved outside of an area associated with the edge services.

30 Claims, 21 Drawing Sheets

(56) References Cited

U.S. PATENT DOCUMENTS

| | | | | |
|---|---|---|---|---|
| 6,990,662 B2* | 1/2006 | Messer | ............ | G06F 9/505 |
| | | | | 709/204 |
| 7,966,039 B2* | 6/2011 | Sadovsky | ............ | H04L 67/10 |
| | | | | 709/227 |
| 8,112,116 B2* | 2/2012 | Sadovsky | ............ | H04L 67/10 |
| | | | | 709/227 |
| 8,355,709 B2* | 1/2013 | Nagaraj | ............ | G06F 9/505 |
| | | | | 455/566 |
| 9,031,733 B1* | 5/2015 | Licis | ............ | F42B 15/01 |
| | | | | 701/29.2 |
| 9,239,740 B2* | 1/2016 | Zhao | ............ | G06F 9/5044 |
| 9,854,032 B2* | 12/2017 | Liu | ............ | H04L 67/104 |
| 9,872,148 B2* | 1/2018 | King | ............ | H04W 4/029 |
| 9,900,275 B2* | 2/2018 | Nielsen | ............ | G06F 11/3006 |
| 10,044,798 B2* | 8/2018 | Liu | ............ | H04L 67/125 |
| 10,484,484 B2* | 11/2019 | Liu | ............ | H04L 67/14 |
| 10,484,485 B2* | 11/2019 | Liu | ............ | H04L 67/10 |
| 10,644,495 B2* | 5/2020 | Male | ............ | H02H 3/207 |
| 10,798,635 B2* | 10/2020 | Seenappa | ............ | H04W 40/02 |
| 11,303,108 B2* | 4/2022 | Male | ............ | H02H 3/10 |
| 2019/0068721 A1* | 2/2019 | Zhang | ............ | H04W 52/0206 |
| 2020/0344838 A1* | 10/2020 | Wu | ............ | H04W 76/28 |
| 2021/0112137 A1* | 4/2021 | Soloway | ............ | H04W 76/25 |
| 2021/0281537 A1* | 9/2021 | Zhang | ............ | H04L 61/4511 |

* cited by examiner

Keep-Alive Message 210

LOCAL CACHE MANAGEMENT IN EDGE NETWORKS

CROSS REFERENCE

The present Application for Patent claims the benefit of U.S. Provisional Patent Application No. 62/914,857 by SOLOWAY et al., entitled "LOCAL CACHE MANAGEMENT IN EDGE NETWORKS," filed Oct. 14, 2019, assigned to the assignee hereof, and expressly incorporated by reference herein.

BACKGROUND

The following relates generally to wireless communications, and more specifically to local cache management in edge networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, an edge data network (EDN) may provide processing assistance or local caching to another network device. In such cases, a client device, such as a UE, may communicate certain application data to an edge application server on the EDN, and the edge application server may perform processing on the received data and provide responsive application data back to the client device. In some cases, edge application server may provide local caching for the client device, which can help reduce latency. Such EDN processes may allow the client device to offload certain processing overhead (e.g., computationally intensive operations) that may allow the client device to use processing resources on other tasks, utilize local caching to reduce latency of network communications, reduce power consumption, and the like. Techniques for efficient use of EDNs in conjunction with a wireless communications system may be desirable in order to provide enhanced network performance and reliability.

SUMMARY

The described techniques relate to improved methods, systems, devices, and apparatuses that support local cache management in edge networks. In various aspects, described techniques provide for establishment and maintenance of edge data network services. In some cases, a user equipment (UE) may register one or more application clients for edge services at an edge application server. In some cases, an edge enabler client at the UE may communicate with an edge enabler server to register such edge services, and one or both of the edge enabler client or edge enabler server may maintain a timer that is used to help prevent resources from being consumed after the edge services are no longer needed (e.g., after the UE no longer needs the edge services or the UE has moved outside of an area associated with the edge services).

In some cases, the edge enabler server may initiate a watchdog timer upon registration of an edge application server for the UE, and the edge enabler client may initiate a keep-alive timer that has a shorter duration than the watchdog timer. Upon expiration of the keep-alive timer, the UE may transmit a keep-alive message to the edge enabler server, which triggers the edge enabler server to reset the watchdog timer. If the UE no longer needs the application client, or moves out of an area associated with the edge application server, the UE may no longer transmit keep-alive messages, and the watchdog timer at the edge enabler server may expire. Upon expiration of the watchdog timer, the edge enabler server may deregister the application client and release local caching and other related resources of the application client. Additionally or alternatively, the edge enabler server may transmit periodic keep-alive probe messages to the edge enabler client at the UE. If the edge enabler server does not receive a response to one or more keep-alive probe messages, the associated application client and resources are released.

A method of wireless communication at a UE is described. The method may include initiating, at an edge enabler client at the UE, a keep-alive timer for maintaining a connection with an edge application server in an edge data network, determining that the connection with the edge application server is to be maintained, and transmitting, responsive to the determining and to an expiration of the keep-alive timer, a keep-alive message to an edge enabler server associated with the edge application server via a wireless communications network.

An apparatus for wireless communication at a UE is described. The apparatus may include a processor, memory coupled with the processor, and instructions stored in the memory. The instructions may be executable by the processor to cause the apparatus to initiate, at an edge enabler client at the UE, a keep-alive timer for maintaining a connection with an edge application server in an edge data network, determine that the connection with the edge application server is to be maintained, and transmit, responsive to the determining and to an expiration of the keep-alive timer, a keep-alive message to an edge enabler server associated with the edge application server via a wireless communications network.

Another apparatus for wireless communication at a UE is described. The apparatus may include means for initiating, at an edge enabler client at the UE, a keep-alive timer for maintaining a connection with an edge application server in an edge data network, determining that the connection with the edge application server is to be maintained, and transmitting, responsive to the determining and to an expiration of the keep-alive timer, a keep-alive message to an edge enabler server associated with the edge application server via a wireless communications network.

A non-transitory computer-readable medium storing code for wireless communication at a UE is described. The code may include instructions executable by a processor to initiate, at an edge enabler client at the UE, a keep-alive timer for maintaining a connection with an edge application server in an edge data network, determine that the connection with the edge application server is to be maintained, and transmit, responsive to the determining and to an expiration of the keep-alive timer, a keep-alive message to an edge enabler server associated with the edge application server via a wireless communications network.

In some examples of the method, apparatuses, and non-transitory computer-readable medium described herein, the keep-alive timer is associated with a watchdog timer at the edge enabler server. In some examples of the method, apparatuses, and non-transitory computer-readable medium described herein, the keep-alive timer provides that the keep-alive message is transmitted before an expiration of the watchdog timer at the edge enabler server.

Some examples of the method, apparatuses, and non-transitory computer-readable medium described herein may further include operations, features, means, or instructions for registering, prior to the initiating the keep-alive timer, at least a first application client of the UE with the edge application server at the edge data network, and where the initiating the keep-alive timer is performed responsive to the registering. Some examples of the method, apparatuses, and non-transitory computer-readable medium described herein may further include operations, features, means, or instructions for establishing, at the edge enabler client prior to the registering, an EDGE-1 connection with the edge enabler server, and where the registering is performed responsive to the establishing the EDGE-1 connection. In some examples of the method, apparatuses, and non-transitory computer-readable medium described herein, the edge enabler server initiates an edge watchdog timer responsive to the EDGE-1 connection establishment.

In some examples of the method, apparatuses, and non-transitory computer-readable medium described herein, the keep-alive message from the edge enabler client resets an edge watchdog timer at the edge enabler server. Some examples of the method, apparatuses, and non-transitory computer-readable medium described herein may further include operations, features, means, or instructions for determining, after the transmitting, that one or more edge application clients at the UE may have ceased operation, and discontinuing transmitting further keep-alive messages responsive to the determining that the one or more edge application clients at the UE may have ceased operation.

Some examples of the method, apparatuses, and non-transitory computer-readable medium described herein may further include operations, features, means, or instructions for receiving, from the edge enabler server, a confirmation message that the one or more edge application clients are to be deregistered at the edge enabler server, and transmitting a feedback message to the edge enabler server responsive to the confirmation message. In some examples of the method, apparatuses, and non-transitory computer-readable medium described herein, the feedback message provides an acknowledgment indication when the one or more edge application clients at the UE may have ceased operation, and provides a negative acknowledgment when the one or more edge application clients at the UE may have not ceased operation.

Some examples of the method, apparatuses, and non-transitory computer-readable medium described herein may further include operations, features, means, or instructions for receiving, from the edge enabler server, a stop notification from each of one or more edge application clients running at the UE, and discontinuing transmitting further keep-alive messages responsive to the receiving.

Some examples of the method, apparatuses, and non-transitory computer-readable medium described herein may further include operations, features, means, or instructions for determining that the UE may have moved outside of an area associated with one or more edge application servers that are serving one or more associated edge application clients at the UE, and discontinuing transmitting further keep-alive messages responsive to the determining that the UE may have moved outside of the area. In some examples of the method, apparatuses, and non-transitory computer-readable medium described herein, one or more edge application clients at the UE are automatically deregistered at the edge enabler server when the keep-alive message is not transmitted for a predetermined time period.

In some examples of the method, apparatuses, and non-transitory computer-readable medium described herein, the edge enabler server releases local caching resources associated with the one or more edge application clients based on the one or more edge application clients being deregistered. In some examples of the method, apparatuses, and non-transitory computer-readable medium described herein, the edge enabler server removes a registration for the UE based on the UE discontinuing communications for at least the predetermined time period.

A method of wireless communication at an edge enabler server of an edge data network is described. The method may include registering at least a first edge application client at a first UE for edge application services, initiating an edge watchdog timer associated with the first UE, receiving, from the first UE via a wireless communications network, a keep-alive message, and resetting the edge watchdog timer responsive to the receiving the keep-alive message.

An apparatus for wireless communication at an edge enabler server of an edge data network is described. The apparatus may include a processor, memory coupled with the processor, and instructions stored in the memory. The instructions may be executable by the processor to cause the apparatus to register at least a first edge application client at a first UE for edge application services, initiate an edge watchdog timer associated with the first UE, receive, from the first UE via a wireless communications network, a keep-alive message, and reset the edge watchdog timer responsive to the receiving the keep-alive message.

Another apparatus for wireless communication at an edge enabler server of an edge data network is described. The apparatus may include means for registering at least a first edge application client at a first UE for edge application services, initiating an edge watchdog timer associated with the first UE, receiving, from the first UE via a wireless communications network, a keep-alive message, and resetting the edge watchdog timer responsive to the receiving the keep-alive message.

A non-transitory computer-readable medium storing code for wireless communication at an edge enabler server of an edge data network is described. The code may include instructions executable by a processor to register at least a first edge application client at a first UE for edge application services, initiate an edge watchdog timer associated with the first UE, receive, from the first UE via a wireless communications network, a keep-alive message, and reset the edge watchdog timer responsive to the receiving the keep-alive message.

In some examples of the method, apparatuses, and non-transitory computer-readable medium described herein, the keep-alive message is associated with a keep-alive timer at the first UE that triggers the keep-alive message prior to an expiration of the edge watchdog timer. In some examples of the method, apparatuses, and non-transitory computer-readable medium described herein, the registering further may include operations, features, means, or instructions for establishing, with an edge enabler client at the first UE, an EDGE-1 connection with the edge enabler server, and where the registering is performed responsive to the establishing the EDGE-1 connection. In some examples of the method, apparatuses, and non-transitory computer-readable medium described herein, the edge enabler server initiates the edge watchdog timer responsive to the EDGE-1 connection establishment.

Some examples of the method, apparatuses, and non-transitory computer-readable medium described herein may further include operations, features, means, or instructions for monitoring for a subsequent keep-alive message from the first UE, determining that the edge watchdog timer may have expired, and deregistering the first edge application client responsive to the determining that the edge watchdog timer may have expired. Some examples of the method, apparatuses, and non-transitory computer-readable medium described herein may further include operations, features, means, or instructions for transmitting, prior to the deregistering, a confirmation message to the first UE that indicates the first edge application client is to be deregistered, and receiving a feedback message from the first UE responsive to the confirmation message.

In some examples of the method, apparatuses, and non-transitory computer-readable medium described herein, the feedback message provides an acknowledgment indication when the first edge application client at the first UE may have ceased operation, and provides a negative acknowledgment when the first edge application client at the first UE may have not ceased operation, and where the edge watchdog timer is reset responsive to the negative acknowledgment. Some examples of the method, apparatuses, and non-transitory computer-readable medium described herein may further include operations, features, means, or instructions for releasing local caching resources associated with the first edge application client responsive to the deregistering. Some examples of the method, apparatuses, and non-transitory computer-readable medium described herein may further include operations, features, means, or instructions for removing each of a set of edge application clients of the first UE based on the first UE discontinuing communications for a predetermined time period.

A method of wireless communication at a UE is described. The method may include receiving, at an edge enabler client at the UE via a wireless communications network, a keep-alive probe message from an edge enabler server at an edge data network, the keep-alive probe message for maintaining a connection between an edge application client at the UE and an edge application server in the edge data network, determining whether the connection between the edge application client and the edge application server is to be maintained, and transmitting, responsive to the determining, a feedback message to the edge enabler server.

An apparatus for wireless communication at a UE is described. The apparatus may include a processor, memory coupled with the processor, and instructions stored in the memory. The instructions may be executable by the processor to cause the apparatus to receive, at an edge enabler client at the UE via a wireless communications network, a keep-alive probe message from an edge enabler server at an edge data network, the keep-alive probe message for maintaining a connection between an edge application client at the UE and an edge application server in the edge data network, determine whether the connection between the edge application client and the edge application server is to be maintained, and transmit, responsive to the determining, a feedback message to the edge enabler server.

Another apparatus for wireless communication at a UE is described. The apparatus may include means for receiving, at an edge enabler client at the UE via a wireless communications network, a keep-alive probe message from an edge enabler server at an edge data network, the keep-alive probe message for maintaining a connection between an edge application client at the UE and an edge application server in the edge data network, determining whether the connection between the edge application client and the edge application server is to be maintained, and transmitting, responsive to the determining, a feedback message to the edge enabler server.

A non-transitory computer-readable medium storing code for wireless communication at a UE is described. The code may include instructions executable by a processor to receive, at an edge enabler client at the UE via a wireless communications network, a keep-alive probe message from an edge enabler server at an edge data network, the keep-alive probe message for maintaining a connection between an edge application client at the UE and an edge application server in the edge data network, determine whether the connection between the edge application client and the edge application server is to be maintained, and transmit, responsive to the determining, a feedback message to the edge enabler server.

In some examples of the method, apparatuses, and non-transitory computer-readable medium described herein, the keep-alive probe message is transmitted by the edge enabler server prior to an expiration of an edge watchdog timer that is running at the edge enabler server. In some examples of the method, apparatuses, and non-transitory computer-readable medium described herein, the feedback message includes an acknowledgment indication based on the UE determining that the connection between the edge application client and the edge application server is to be maintained, and the feedback message includes a negative acknowledgment indication based on the UE determining that the connection between the edge application client and the edge application server is to be released. In some examples of the method, apparatuses, and non-transitory computer-readable medium described herein, the edge enabler server terminates a registration and releases resources associated with the edge application client responsive to the negative acknowledgment indication.

A method of wireless communication at an edge enabler server of an edge data network is described. The method may include registering at least a first edge application client at a first UE for edge application services, initiating an edge watchdog timer associated with the first UE, transmitting, to the first UE via a wireless communications network, a keep-alive probe message prior to an expiration of the edge watchdog timer, monitoring, responsive to the transmitting the keep-alive probe message, for a feedback response from the first UE, and determining whether to reset the edge watchdog timer based on the monitoring.

An apparatus for wireless communication at an edge enabler server of an edge data network is described. The apparatus may include a processor, memory coupled with the processor, and instructions stored in the memory. The instructions may be executable by the processor to cause the apparatus to register at least a first edge application client at a first UE for edge application services, initiate an edge watchdog timer associated with the first UE, transmit, to the first UE via a wireless communications network, a keep-alive probe message prior to an expiration of the edge watchdog timer, monitor, responsive to the transmitting the keep-alive probe message, for a feedback response from the first UE, and determine whether to reset the edge watchdog timer based on the monitoring.

Another apparatus for wireless communication at an edge enabler server of an edge data network is described. The apparatus may include means for registering at least a first edge application client at a first UE for edge application services, initiating an edge watchdog timer associated with the first UE, transmitting, to the first UE via a wireless communications network, a keep-alive probe message prior to an expiration of the edge watchdog timer, monitoring, responsive to the transmitting the keep-alive probe message, for a feedback response from the first UE, and determining whether to reset the edge watchdog timer based on the monitoring.

A non-transitory computer-readable medium storing code for wireless communication at an edge enabler server of an edge data network is described. The code may include instructions executable by a processor to register at least a first edge application client at a first UE for edge application services, initiate an edge watchdog timer associated with the first UE, transmit, to the first UE via a wireless communications network, a keep-alive probe message prior to an expiration of the edge watchdog timer, monitor, responsive to the transmitting the keep-alive probe message, for a feedback response from the first UE, and determine whether to reset the edge watchdog timer based on the monitoring.

Some examples of the method, apparatuses, and non-transitory computer-readable medium described herein may further include operations, features, means, or instructions for receiving the feedback response from the first UE, and resetting the edge watchdog timer responsive the feedback response indicating an acknowledgment of the keep-alive probe message. Some examples of the method, apparatuses, and non-transitory computer-readable medium described herein may further include operations, features, means, or instructions for determining that no feedback response is received from the UE prior to the expiration of the watchdog timer, or that a negative acknowledgment feedback response is received from the UE, and deregistering the first edge application client at the first UE. In some examples of the method, apparatuses, and non-transitory computer-readable medium described herein, the edge enabler server terminates a registration and releases resources associated with the first edge application client responsive to the determining that no feedback response is received or that the negative acknowledgment feedback response is received from the UE.

DETAILED DESCRIPTION

Figure 1:
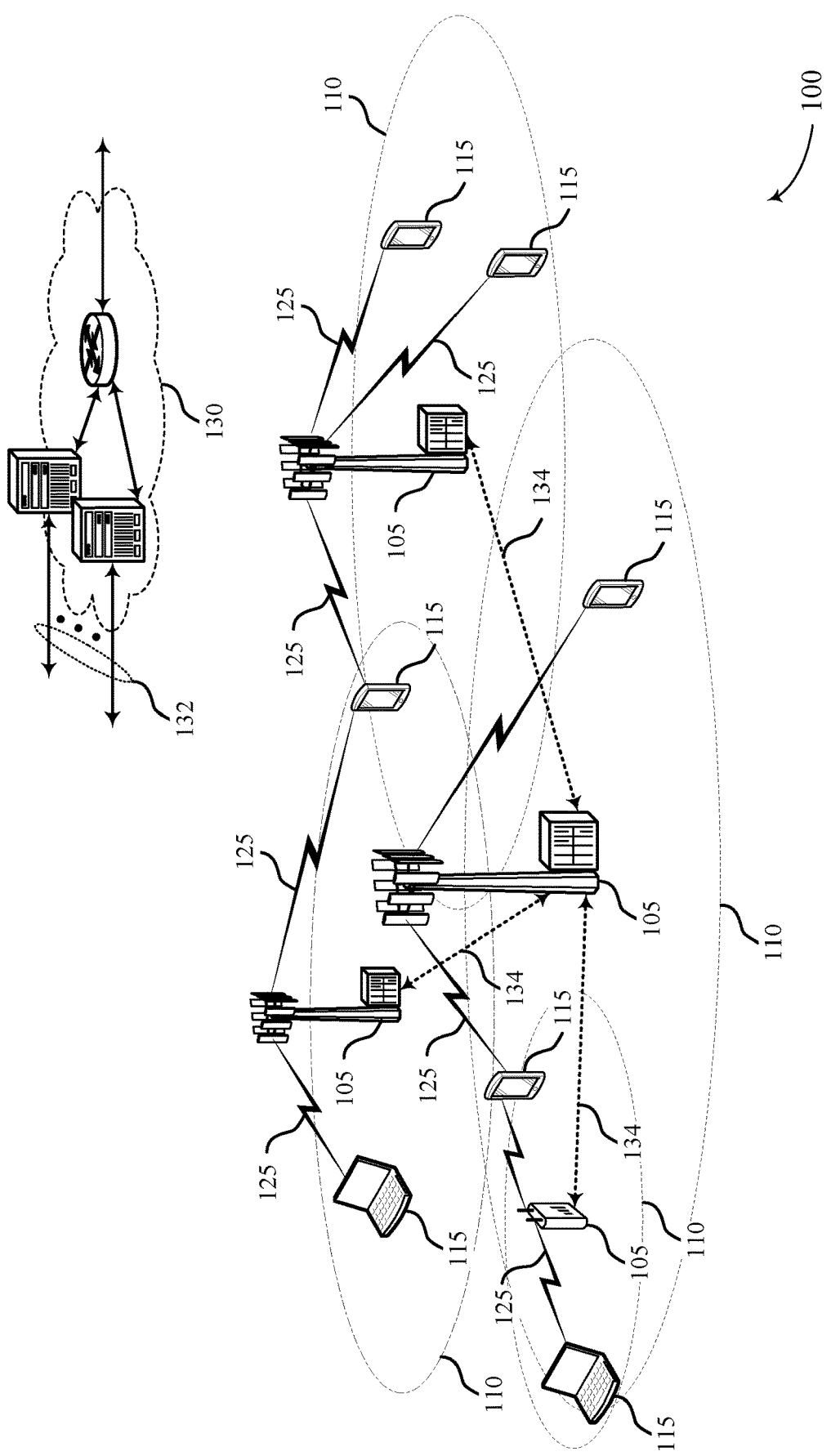
FIG. 1 illustrates an example of a system for wireless communications that supports local cache management in edge networks in accordance with aspects of the present disclosure.

Various aspects of the present disclosure provide for an edge data network (EDN) that may provide application services for one or more user equipment (UE) application clients, and use one or more timers to maintain only application services that are continuing to be used at the UE. In some cases, a UE may register an application client with an application server at the EDN. The application server at the EDN may have various associated resources, including processing resources for an instance of the application server for the UE, local cache resources for the UE, or both. The application server may be registered through an edge enabler client at the UE, and an edge enabler server at the EDN. In some cases, the edge enabler client may initiate a keep-alive timer in response to registering the application client with the edge application server (e.g., based on a lifetime value provided by the edge enabler server which may be based on a proposed lifetime provided in an edge registration request from the edge enabler client), and transmit a keep-alive message (e.g., a registration request with an update indication) to the edge enabler server in response to expiration of the keep-alive timer. The edge enabler server may initiate a watchdog timer in response to registering the application client of the UE, and may reset the watchdog timer in response to receiving the keep-alive message from the UE. In cases where the edge enabler server does not receive the keep-alive message and the watchdog timer expires, the edge application server instance and associated resources at the EDN may be released (e.g., the edge application server will treat the registration expiration at an end of the lifetime value as an implicit de-registration). In some cases, the edge enabler server, in response to the expiration of the watchdog timer, may transmit a keep-alive probe message to the UE to confirm that the application server and associated resources at the EDN are to be released, and may perform such releases if a confirming response is received or if no response is received.

In some cases, the edge enabler server, upon registration of an application client of the UE with an edge application server, may initiate a keep-alive timer. Upon expiration of the keep-alive timer at the edge enabler server, an keep-alive probe message may be transmitted to the UE to confirm that the UE is still present and using the edge application server. If the UE does not respond to one or more the keep-alive probe messages, or if the UE confirms that the edge application server and resources may be released, the edge enabler server may release the edge application server and associated resources.

Such techniques may enhance the performance and efficiency of an EDN by reducing the amount of dangling resources that may be present due to UE movement within a network. For example, as the UE moves from one location to another, different base stations may serve the UE, and such different base stations may be located relatively far away from an edge application server that is providing processing support or local caching to the UE. In cases where an edge application server is located relatively far from the UE, latency associated with application data traffic between the UE and edge application server may be increased, which may reduce overall network efficiency. For example, the UE may be associated with a vehicle (e.g., an automobile, an aircraft, an unmanned aerial vehicle (e.g., drone), and the like) that moves between coverage areas of different base stations relatively quickly. As different base stations have different latency for communications with a same edge application server instance, latency for application data traffic exchanged between the UE and the edge application server may change.

For example, one or more edge application servers may provide local caching (e.g., Mobile CDN, MEC) which may help to reduce long backhaul delay associated with an application. In order to be effective, the local cache should be physically close to or inside a serving base station of the UE, such that latency between the local cache and UE is relatively low. In some cases, network-based caching decisions can provide improved service when UE assistance is available or not available. In order to initiate such local caching, a UE that executes an application that would benefit from an EDN service, and the EDN is informed of the application by either the UE or through an independent path through the application. If the edge service is not already available, the EDN may instantiate an edge process in the EDN to service that UE and any other UEs that may use that the edge service in the future. In some cases, an edge enabler server that manages edge services may decide to delay an edge service availability until a certain number of UEs in that edge network desire that edge service (e.g., until a critical mass of UEs are present). The edge service, then instantiates a UE context for any UE requesting that edge service. Such a process may maintain a UE local cache on the EDN until the least recent use local caching event happened to remove those UEs, or the number of UEs drops below the desired threshold.

As indicated above, efficient management of such a local cache to service a maximum number of UEs that request an edge service may help to enhance the overall efficiency and latency of a network. Using timers and keep-alive messages as discussed herein enables the edge enabler server to remove the UE context for those UEs and keep an accurate count of UEs that benefit from that edge service (e.g., the edge enabler server may detect an abnormal termination of a UE registration or an edge application server registration). Keeping the local caching for those UEs that are no longer able to communicate can be a waste of local caching resource, and techniques provided herein may help to reduce such inefficient resource usage. Such techniques may help to enhance the local caching management to service UEs that are using the service and allow additional UEs to register more quickly. Additional UE use of such services may help improve, for example, video QoE, provide less video stalling, provide less initial playout delay, higher video quality, application acceleration, reduced response time of mobile applications, or any combinations thereof.

Aspects of the disclosure are initially described in the context of a wireless communications system. Examples of UE EDN application service registration and release are then described for techniques provided herein. Aspects of the disclosure are further illustrated by and described with reference to apparatus diagrams, system diagrams, and flowcharts that relate to local cache management in edge networks.

FIG. 1 illustrates an example of a wireless communications system 100 that supports edge discovery techniques in wireless communications systems in accordance with aspects of the present disclosure. The wireless communications system 100 includes base stations 105, UEs 115, and a core network 130. In some cases, as discussed with reference to FIGS. 2 through 5, an edge data network may be deployed in conjunction with wireless communications system 100, in which one or more edge data network components may be co-located with one or more core network 130 components, one or more base stations 105, or combinations thereof. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, an edge data network may be deployed in conjunction with wireless communications system 100, and UEs 115 may be configured with one or more edge data network configurations. In some cases, a UE 115 may register one or more application clients for edge services at an edge application server. In order to maintain edge application servers that are continuing to be used by the UE 115, an edge enabler server at the edge data network, an edge enabler client at the UE 115, or both, may initiate a timer that is used to confirm the edge application server is continuing to be used. Such techniques may help prevent resources from being consumed after the edge services are no longer needed, such as after the UE 115 no longer needs the edge services or the UE 115 has moved outside of an area associated with the edge services.

Figure 2:
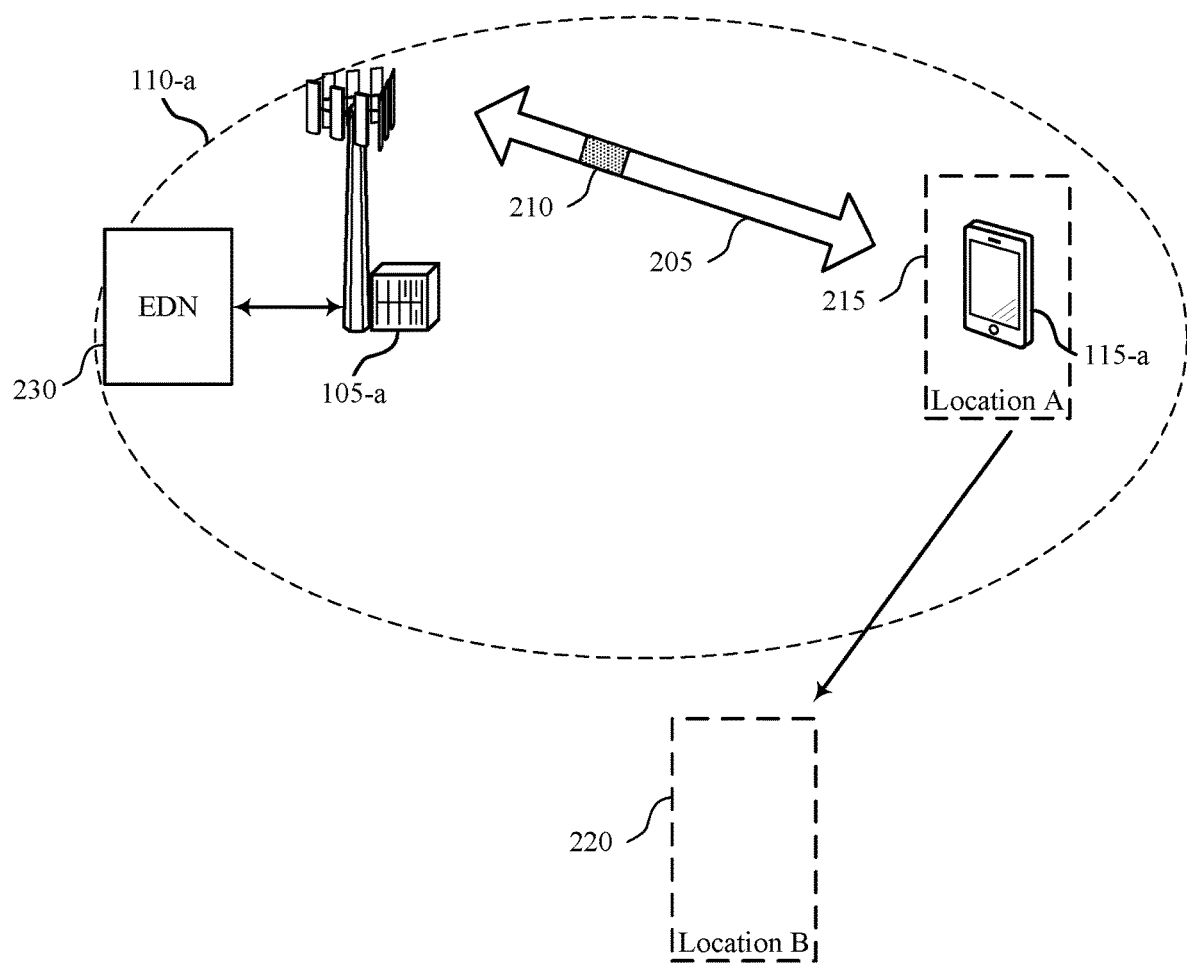
FIG. 2 illustrates an example of a portion of a wireless communications system that supports local cache management in edge networks in accordance with aspects of the present disclosure.
Figure 2:

FIG. 2 illustrates an example of a wireless communications system 200 that supports local cache management in edge networks in accordance with aspects of the present disclosure. In some examples, wireless communications system 200 may implement aspects of wireless communications system 100. In some examples, the wireless communications system 200 may include a UE 115-*a* and a base station 105-*a* which may be examples of UEs 115 and base stations 105 described with reference to FIG. 1. The UE 115-*a* may communicate with the base station 105-*a* via an access link 205 which the UE 115-*a* and/or an edge enabler server, via base station 105-*a*, may use to transmit one or more keep-alive messages 210.

In this example, the UE 115-*a* may initially be in a first location 215 (Location A). In some cases, the UE 115-*a* may register an application client with an edge application server at edge data network 230. In this example, edge data network 230 may have components or network nodes that are in communication with the first base station 105-*a* and one or more other base stations. In some cases, the edge data network 230 may have one or more servers, such as an edge configuration server, an edge enabler server, an edge application server, or combinations thereof, that are co-located with base stations 105. For example, a first edge application server may be co-located, or located in close proximity, with the base station 105-*a*, and a second edge application server may be co-located, or located in close proximity, to another base station. In such cases, the UE 115-*a*, when located at the first location 215-*a*, may be served by a first edge application server instance at the first edge application server that is associated with the base station 105-*a*. Further, if the UE 115-*a* moves to a second location 220, which is outside of coverage area 110-*a* of the base station 105-*a*, the UE 115-*a* may be served by a different base station. In such cases, the first edge application server instance at the first base station 105-*a* may have a relatively large amount of latency for communicating application data traffic with an application client at the UE 115-*a*.

In accordance with various aspects of the present disclosure, the edge data network 230, UE 115-*a*, or both, may transmit one or more keep-alive messages 210 that may allow the edge data network 230 to maintain instances of edge application servers and their associated resources (e.g., local caching resources) only for application clients that continue to need edge services provided by the instances of the edge application servers. In some cases, the keep-alive messages 210 may include registration request messages with an update indication, that are transmitted prior to the expiration of a lifetime value of the current registration, to maintain the current registration, and otherwise the edge enabler server will treat the registration expiration as an implicit de-registration.

In some cases, the edge enabler server may monitor which UEs 115 are currently active and will remove those UEs that are no longer able to communicate. In such cases, an "edge watchdog timer" may be maintained between the edge enabler server and the edge enabler client. In order to maintain the edge connection between the application client and the edge application server, the edge enabler client transmits a keep-alive message to the edge enabler server before the end of the watchdog timer period. At the UE 115-*a*, the edge application client(s) can register with the edge enabler client for an "edge watchdog event" (e.g., by providing a proposed lifetime in a registration request).

For example, the edge enabler client at UE 115-*a* may establish an EDGE-1 connection with the edge enabler server if one is not yet established. Upon the EDGE-1 connection establishment, the edge enabler server may start the edge watchdog timer for the UE 115-*a*. At the UE 115-*a*, the edge enabler client transmits periodic keep-alive messages to the edge enabler server. In some cases, the edge enabler client may initiate a keep-alive timer that has duration that is less than a duration of the edge watchdog timer, such that the keep-alive message is transmitted responsive to the expiration of the keep-alive timer prior to the expiration of the watchdog timer (e.g., based on the lifetime value) at the edge enabler server.

Upon receiving the keep-alive message (e.g., registration request with an update indication having another proposed lifetime) from the edge enabler client, the edge enabler server resets the edge watchdog timer. At the UE 115-*a*, at some point after registering the application client, it may be determined to discontinue transmitting keep-alive messages (e.g., based on the edge enabler client receiving a "STOP notification" from all of its application clients). If the edge enabler client does not deregister from the edge enabler server, the edge watchdog timer expires on the edge enabler server side. The edge enabler server, upon expiration of the edge watchdog timer, then releases local caching for the related application(s), and removes registration for the UE 115-*a* (and any other UEs) that are no longer able to communicate. In some cases, the edge enabler server may transmit a confirmation message to the edge enabler client to confirm that the edge application server and associated resources are to be released. If the UE 115-*a* transmits an acknowledgment (ACK) or does not transmit a response (e.g., due to the UE 115-*a* moving out of coverage area 110-*a*), the edge application server and associated resources are released. If the UE 115-*a* transmits an indication that the edge application server is to be maintained (e.g., by transmitting a negative acknowledgment (NACK)), the edge enabler server may reset the edge watchdog timer.

In other cases, the edge watchdog timer is maintained between the edge enabler server and the edge enabler client, and the edge enabler server transmits a keep-alive probe message to the edge enabler client before the end of the watchdog timer period. The expected response from a reachable edge enabler client is to acknowledge receipt of the keep-alive probe by returning an ACK message. In some cases, if a certain number of keep-alive probe messages are sent by the edge enabler server to an edge enabler client and no response ACK is received by the edge enabler server, then the edge enabler server will terminate the allocated contexts and resources for the UE 115-*a*.

Figure 3:
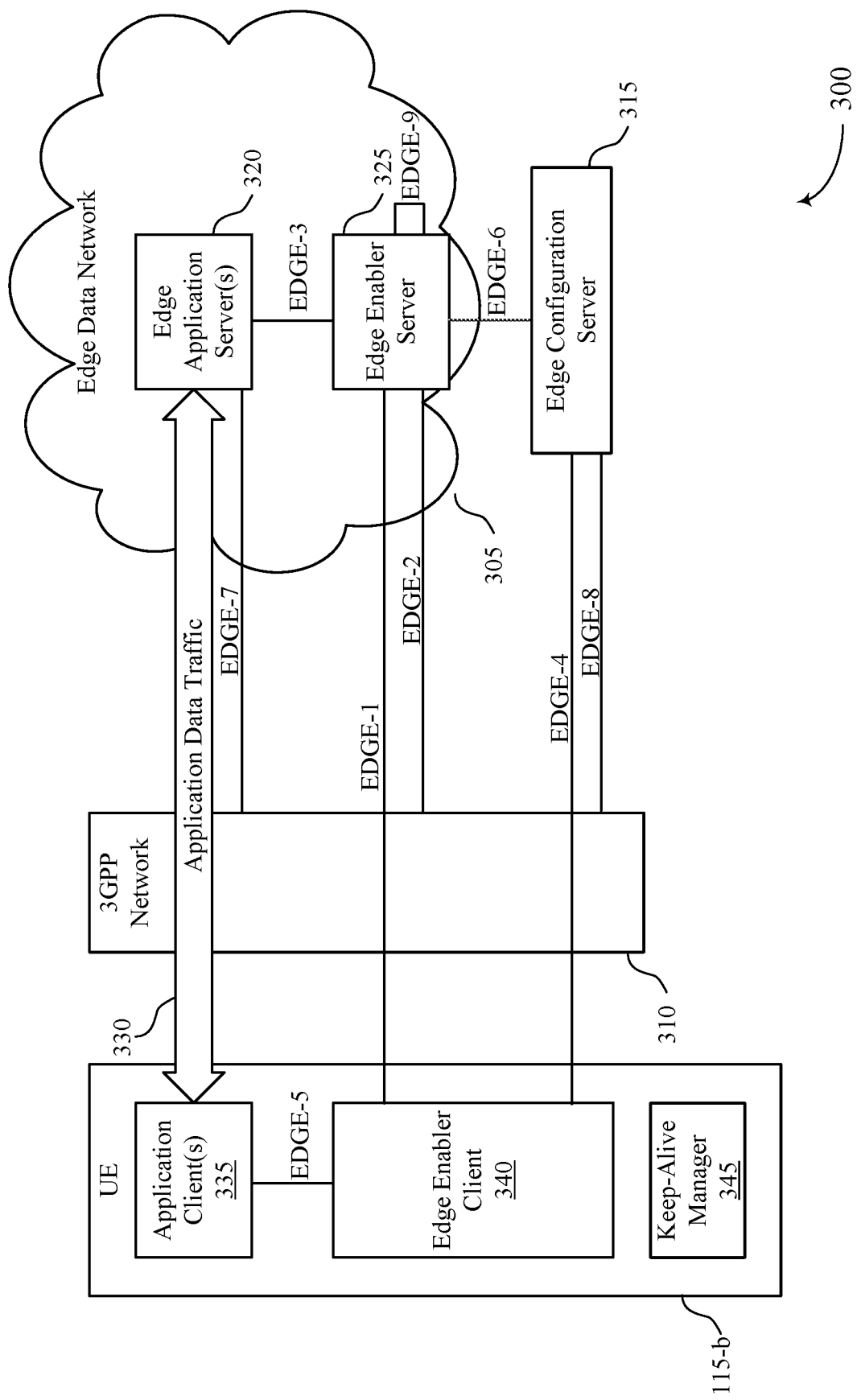
FIG. 3 illustrates an example of an edge data network that supports local cache management in edge networks in accordance with aspects of the present disclosure.

FIG. 3 illustrates an example of an edge data network 300 that supports local cache management in edge networks in accordance with aspects of the present disclosure. In some examples, edge data network 300 may implement aspects of wireless communications system 100 or 200. In this example, a UE 115-*b* may communicate, via a wireless network 310 (e.g., a 3GPP core network such as a NR core network), with an edge data network 305.

In the example of FIG. 3, an edge configuration server 315 may communicate with an edge enabler client 340 at the UE 115-*b*, via an EDGE-4 interface, and may communicate with the wireless network 310 via an EDGE-8 interface. In some cases, a number of EDGE interfaces may be defined that provide for communications protocols between different edge-related entities (e.g., EDGE-1 through EDGE-9 interfaces). The edge enabler client 340 at the UE 115-*b* may manage requests and configurations for exchanging application data traffic 330 between one or more application clients 335 at the UE 115-*b* and one or more edge application servers 320, which may also be referred to as edge application server instances, that may provide processing resources, local caching resources, and the like, for the UE 115-*b*. The edge enabler client 340 at the UE 115-*b* may also communicate with an edge enabler server 325 at the edge data network 305 via an EDGE-1 interface. The edge enabler client 340 may perform discovery functions to discover available edge data networks 305 and establish one or more connections for application data traffic 330.

Discovery functions may include discovery of edge data networks 305 and edge enabler servers (e.g., via the EDGE-4 interface). The discovery process may include a request that is sent by the edge enabler client 340. The request may include the identities of application client(s) that may initiate application data traffic with the discovered edge application server(s). The discovery request may also include an application client profile. In response to the discovery request, the edge enabler server 325 may coordinate with edge application server(s) 320 to register the application client(s) 335 to allow for application data traffic 330 to be exchanged. Upon registration of one or more application client(s) 335 keep-alive manager 345 at the UE 115-*b* may initiate a keep-alive timer and transmit periodic keep-alive messages to maintain the registration. In other cases, the edge enabler server 325 may transmit periodic keep-alive messages to the UE 115-*b*, which may respond with ACK messages to indicate that the connection is to be maintained.

Figure 4:
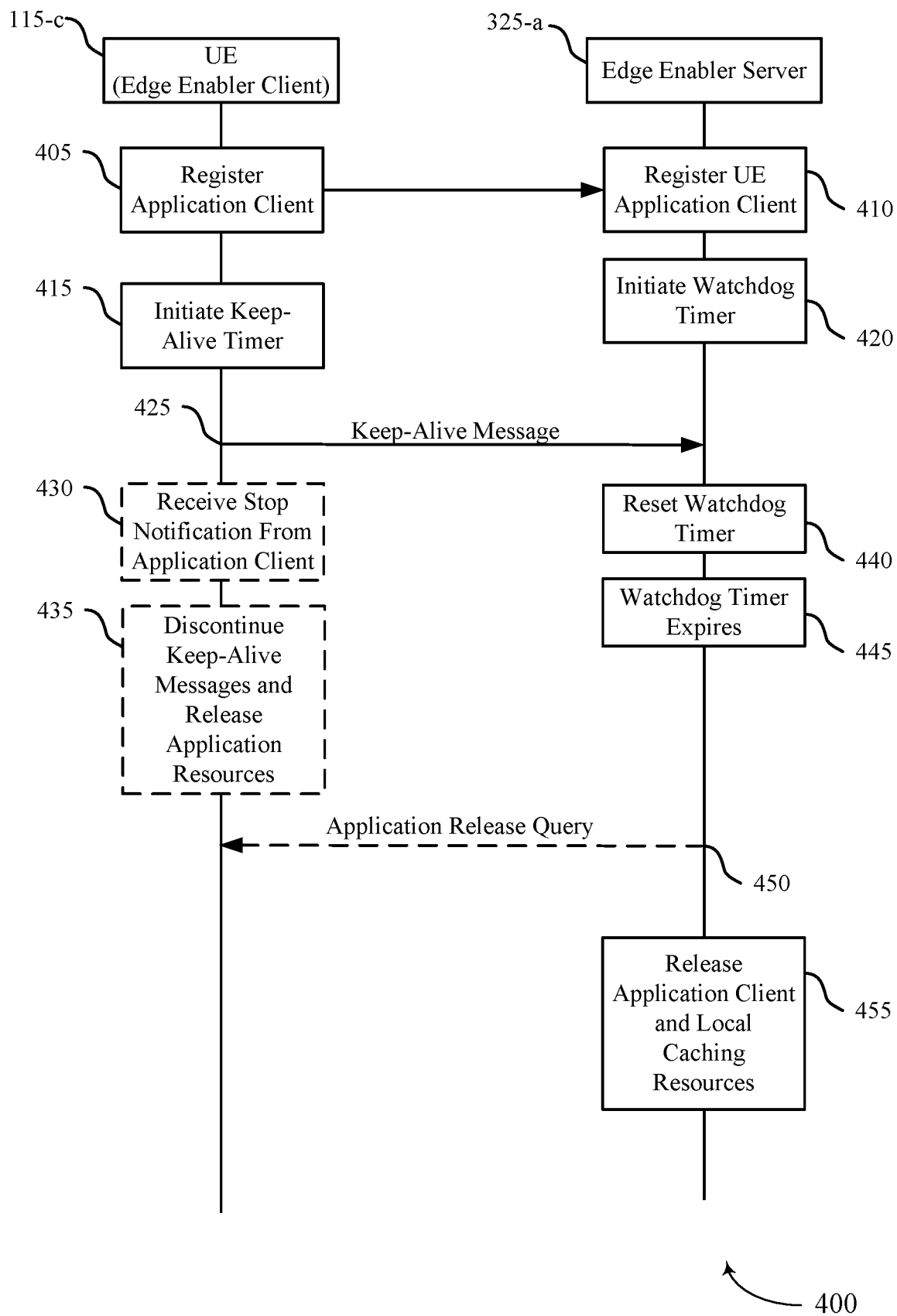
FIG. 4 illustrates an example of a process flow that supports local cache management in edge networks in accordance with aspects of the present disclosure.

FIG. 4 illustrates an example of a process flow 400 that supports local cache management in edge networks in accordance with aspects of the present disclosure. In some examples, process flow 400 may implement aspects of wireless communications system 100 or 200, or edge data network 300. Process flow 400 may be implemented by a UE 115-*c*, and an edge enabler server 325-*a*, or any other examples of UEs 115 or edge enabler servers 325 as described herein. Alternative examples of the following may be implemented, where some steps are performed in a different order than described or are not performed at all. In some cases, steps may include additional features not mentioned below, or further steps may be added.

At 405, the UE 115-*c*, such as an edge enabler client at the UE 115-*c*, may register an application client with edge enabler server 325-*a*. At 410, the edge enabler server 325-*a* may register the UE application client in response to the registration request from the edge enabler client at the UE 115-*a*.

At 415, the UE 115-*c* may initiate a keep-alive timer. In some cases, the keep-alive timer may have a duration that corresponds to a watchdog timer at the edge enabler server 325-*a*. At 420, the edge enabler server 325-*a* may initiate the watchdog timer. The UE 115-*b*, at 425, may transmit, in response to expiration of the keep-alive timer, a keep-alive message to the edge enabler server 325-*a*. At 440, in response to the keep-alive message, the edge enabler server 325-*a* may reset the edge watchdog timer. In some cases, the operations of 415 through 440 may be repeated until the UE 115-*a* moves out of an area associated with the edge enabler server 325-*a*, or until the UE 115-*a* no longer needs the edge application server.

Optionally, at 430, the UE 115-*c* may receive a stop notification from the application client. In some cases, the stop notification may be received based on the application client no longer needing processing or resources of the associated edge application server (e.g., due to termination of an application or service that exchanged application data with the edge application server). Optionally, at 435, the UE 115-*a* may discontinue keep alive messages and release application client resources based on the stop notification.

At 445, based on not receiving keep-alive messages, the watchdog timer may expire at the edge enabler server 325-*a*. In some cases, optionally at 450, the edge enabler server 325-*a* may transmit an application release query to the UE 115-*c*. In cases where the UE 115-*c* has moved from the area associated with the edge enabler server 325-*a*, or in cases where the UE 115-*a* has received a stop notification from each application client, UE 115-*c* may not transmit a response to the application release query, such as illustrated in FIG. 4. In cases where the UE 115-*c* does want to maintain the application client, the UE 115-*c* may transmit a response that indicates to keep the application client alive (e.g., an ACK message to a keep-alive query). As indicated, in this example, the UE 115-*c* does not transmit a message in response to the application release query, and the edge enabler server 325-*a*, at 455, may automatically release an edge application server instance associated with the application client, and release the local caching resource. By releasing the processing and caching resource, these resources are available for other UEs.

Figure 5:
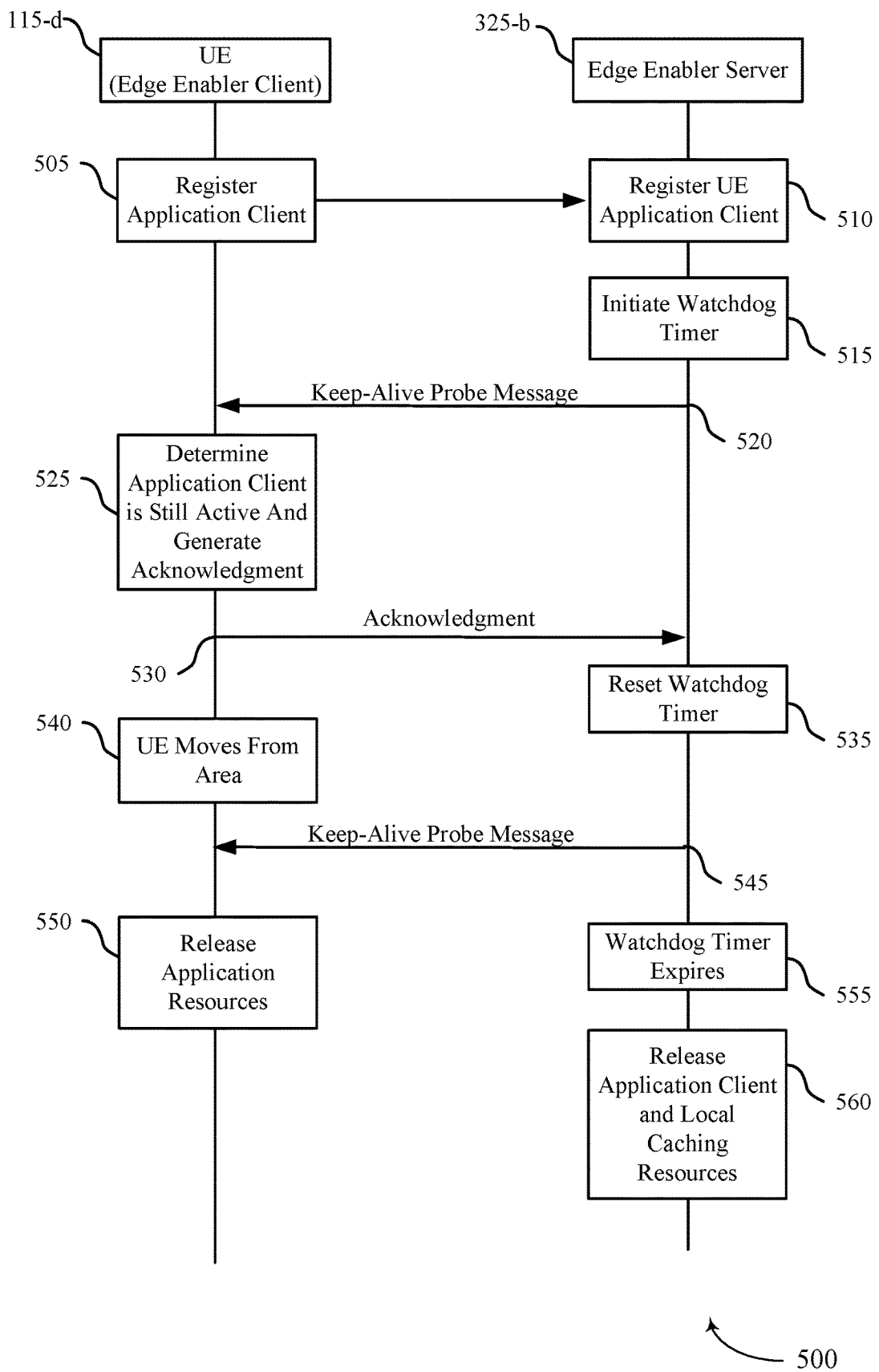
FIG. 5 illustrates an example of a process flow that supports local cache management in edge networks in accordance with aspects of the present disclosure.

FIG. 5 illustrates an example of a process flow 500 that supports local cache management in edge networks in accordance with aspects of the present disclosure. In some examples, process flow 500 may implement aspects of wireless communications system 100 or 200, or edge data network 300. Process flow 500 may be implemented by a UE 115-*d*, and an edge enabler server 325-*b*, or any other examples of UEs 115 or edge enabler servers 325 as described herein. Alternative examples of the following may be implemented, where some steps are performed in a different order than described or are not performed at all. In some cases, steps may include additional features not mentioned below, or further steps may be added.

At 505, the UE 115-*d*, such as an edge enabler client at the UE 115-*d*, may register an application client with edge enabler server 325-*b*. At 510, the edge enabler server 325-*b* may register the UE application client in response to the registration request from the edge enabler client at the UE 115-*b*.

At 515, the edge enabler server 325-*b* may initiate a watchdog timer. The edge enabler server 325-*b*, at 520, may transmit, in response to expiration of the watchdog timer, a keep-alive message to the UE 115-*d*. At 525, in response to the keep-alive message, the UE 115-*d* may determine whether the application client is still active, and if so generate an acknowledgment. At 530, the UE 115-*d* may transmit the acknowledgment to the edge enabler server 325-*b*.

At 535, the edge enabler server 325-*b* may reset the edge watchdog timer responsive to receiving the acknowledgment from the UE 115-*d*. The operations at 520 through 535 may be repeated a number of times. In this example, at 540, the UE 115-*d* may move from an area associated with the edge enabler server 325-*b* (e.g., out of a service area associated with a base station that is co-located with the edge enabler server 325-*b*.)

In some cases, in response to moving out of the area associated with the edge enabler server 325-*b*, the UE 115-*d* may release application client resources, as indicated at 550. Further, in such a case, the UE 115-*d* may not transmit an acknowledgment and, at 555, the watchdog timer at the edge enabler server. At 560, the edge enabler server 325-*b* may release the application client and local caching resources, and thereby make the associated edge application server instance and associated resources available for another UE.

Figure 6:
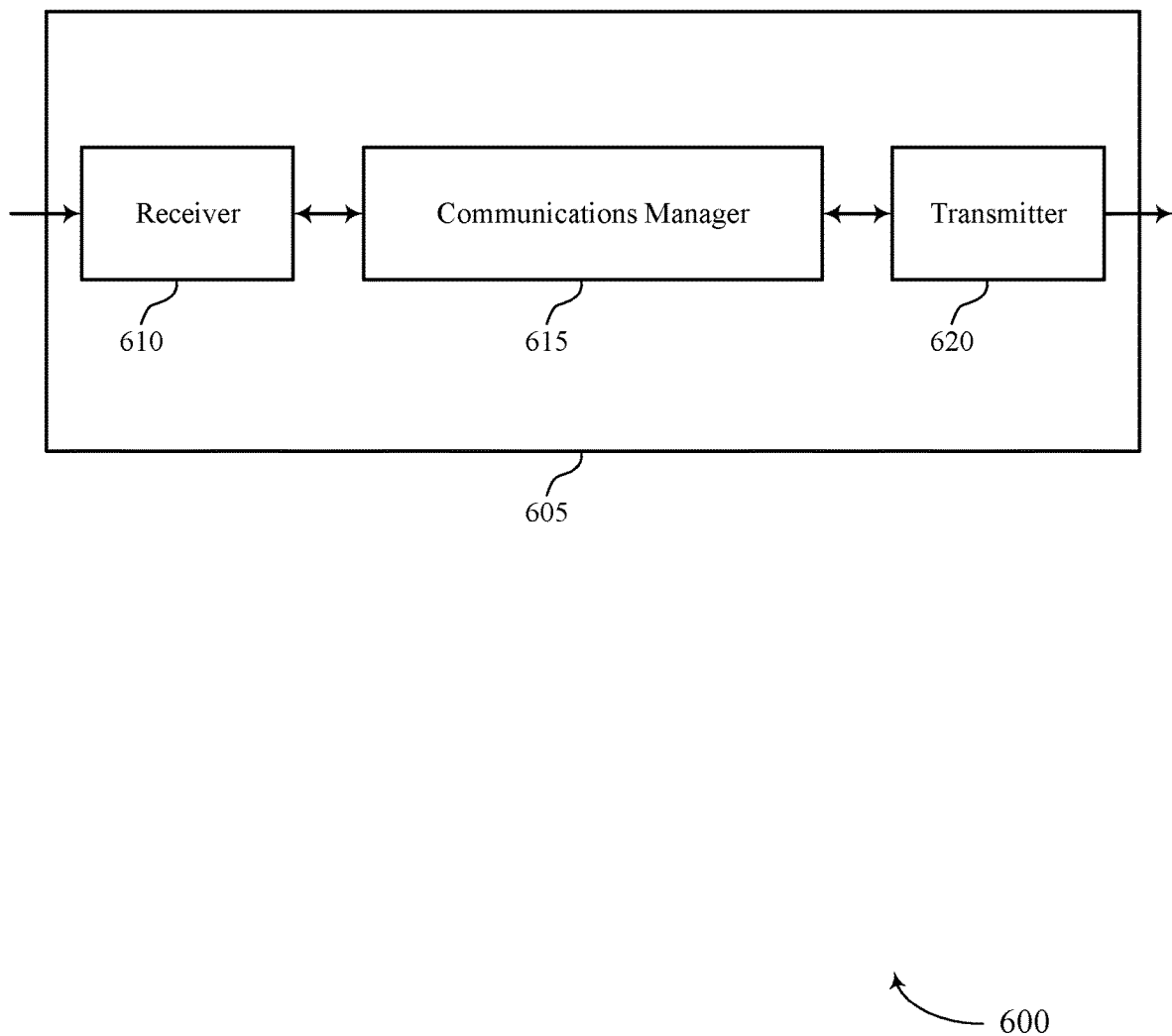
FIGS. 6 and 7 show block diagrams of devices that support local cache management in edge networks in accordance with aspects of the present disclosure.

FIG. 6 shows a block diagram 600 of a device 605 that supports local cache management in edge networks in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to local cache management in edge networks, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may initiate, at an edge enabler client at the UE, a keep-alive timer for maintaining a connection with an edge application server in an edge data network, determine that the connection with the edge application server is to be maintained, and transmit, responsive to the determining and to an expiration of the keep-alive timer, a keep-alive message to an edge enabler server associated with the edge application server via a wireless communications network.

The communications manager 615 may also receive, at an edge enabler client at the UE via a wireless communications network, a keep-alive probe message from an edge enabler server at an edge data network, the keep-alive probe message for maintaining a connection between an edge application client at the UE and an edge application server in the edge data network, determine whether the connection between the edge application client and the edge application server is to be maintained, and transmit, responsive to the determining, a feedback message to the edge enabler server. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
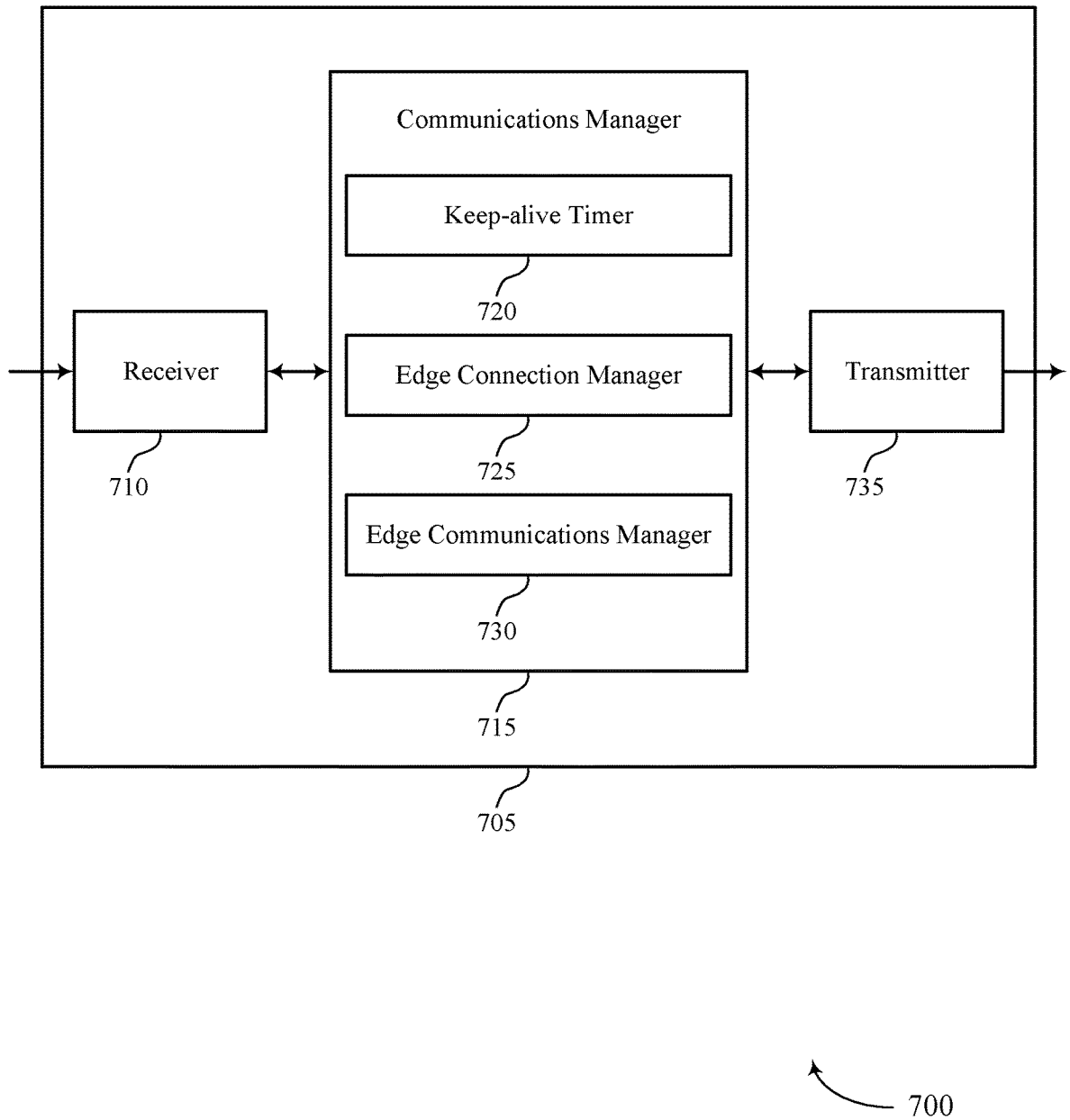

FIG. 7 shows a block diagram 700 of a device 705 that supports local cache management in edge networks in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to local cache management in edge networks, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a keep-alive timer 720, an edge connection manager 725, and an edge communications manager 730. The communications manager 715 may be an example of aspects of the communications manager 910 described herein.

In some cases, the keep-alive timer 720 may initiate, at an edge enabler client at the UE, a keep-alive timer for maintaining a connection with an edge application server in an edge data network. The edge connection manager 725 may determine that the connection with the edge application server is to be maintained. The edge communications manager 730 may transmit, responsive to the determining and to an expiration of the keep-alive timer, a keep-alive message to an edge enabler server associated with the edge application server via a wireless communications network.

In some cases, the edge connection manager 725 may receive, at an edge enabler client at the UE via a wireless communications network, a keep-alive probe message from an edge enabler server at an edge data network, the keep-alive probe message for maintaining a connection between an edge application client at the UE and an edge application server in the edge data network and determine whether the connection between the edge application client and the edge application server is to be maintained. The edge communications manager 730 may transmit, responsive to the determining, a feedback message to the edge enabler server.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
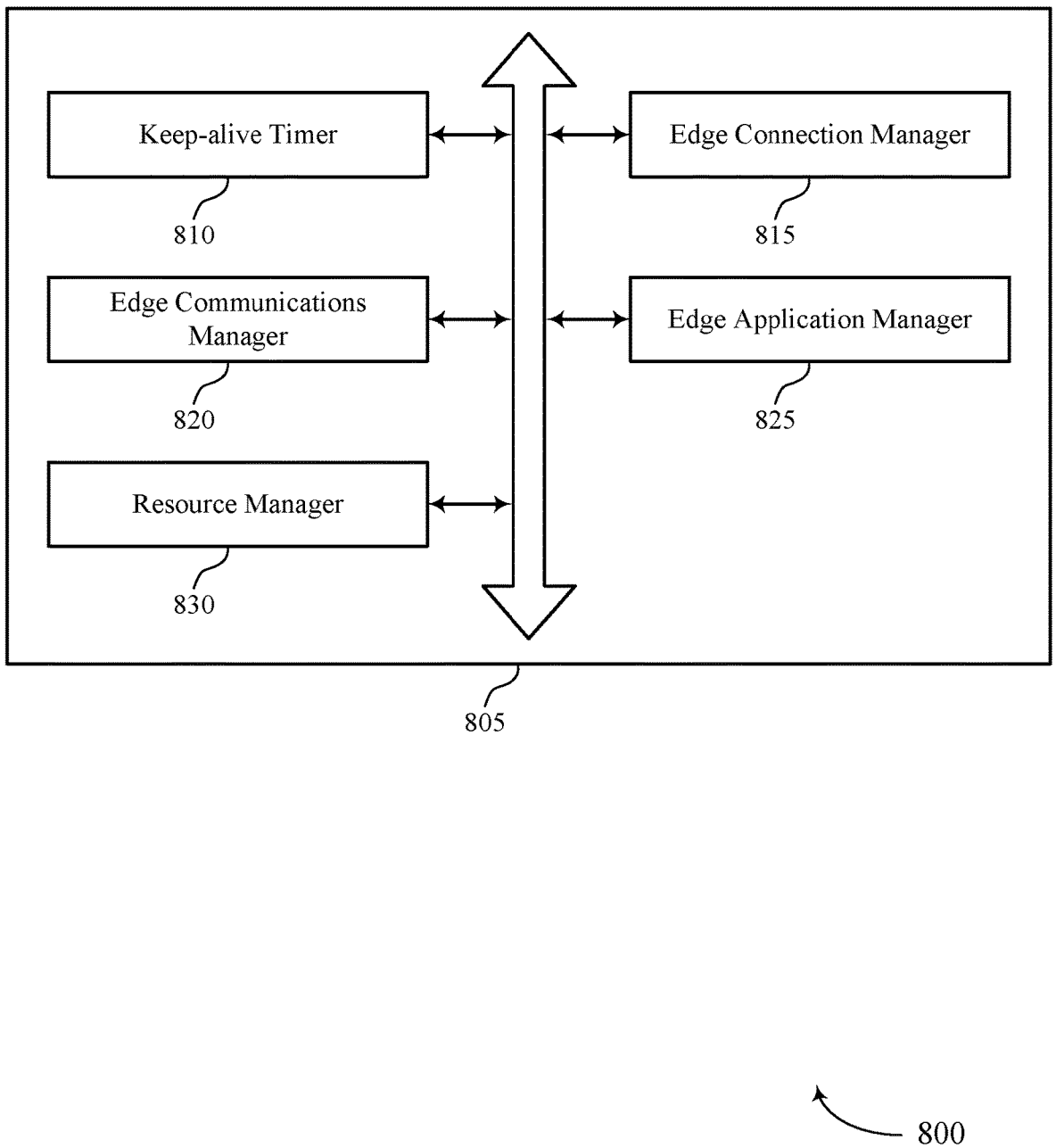
FIG. 8 shows a block diagram of a communications manager that supports local cache management in edge networks in accordance with aspects of the present disclosure.

FIG. 8 shows a block diagram 800 of a communications manager 805 that supports local cache management in edge networks in accordance with aspects of the present disclosure. The communications manager 805 may be an example of aspects of a communications manager 615, a communications manager 715, or a communications manager 910 described herein. The communications manager 805 may include a keep-alive timer 810, an edge connection manager 815, an edge communications manager 820, an edge application manager 825, and a resource manager 830. Each of these modules may communicate, directly or indirectly, with one another (e.g., via one or more buses).

The edge enabler client at the UE may initiate a keep-alive timer 810 for maintaining a connection with an edge application server in an edge data network. In some cases, the keep-alive timer is associated with a watchdog timer at the edge enabler server. In some cases, the keep-alive timer provides that the keep-alive message is transmitted before an expiration of the watchdog timer at the edge enabler server.

The edge connection manager 815 may determine that the connection with the edge application server is to be maintained. In some examples, the edge connection manager 815 may receive, at an edge enabler client at the UE via a wireless communications network, a keep-alive probe message from an edge enabler server at an edge data network, the keep-alive probe message for maintaining a connection between an edge application client at the UE and an edge application server in the edge data network. In some examples, the edge connection manager 815 may determine whether the connection between the edge application client and the edge application server is to be maintained. In some examples, the edge connection manager 815 may establish, at the edge enabler client prior to the registering, an EDGE-1 connection with the edge enabler server, and where the registering is performed responsive to the establishing the EDGE-1 connection.

In some examples, the edge connection manager 815 may receive, from the edge enabler server, a stop notification from each of one or more edge application clients running at the UE. In some examples, the edge connection manager 815 may discontinue transmitting further keep-alive messages responsive to the receiving.

In some examples, the edge connection manager 815 may determine that the UE has moved outside of an area associated with one or more edge application servers that are serving one or more associated edge application clients at the UE. In some examples, the edge connection manager 815 may discontinue transmitting further keep-alive messages responsive to the determining that the UE has moved outside of the area.

In some cases, the keep-alive probe message is transmitted by the edge enabler server prior to an expiration of an edge watchdog timer that is running at the edge enabler server.

The edge communications manager 820 may transmit, responsive to the determining and to an expiration of the keep-alive timer, a keep-alive message to an edge enabler server associated with the edge application server via a wireless communications network. In some examples, the edge communications manager 820 may transmit, responsive to the determining, a feedback message to the edge enabler server.

In some examples, the edge communications manager 820 may register, prior to the initiating the keep-alive timer, at least a first application client of the UE with the edge application server at the edge data network, and where the initiating the keep-alive timer is performed responsive to the registering. In some cases, the edge enabler server initiates an edge watchdog timer responsive to the EDGE-1 connection establishment. In some cases, the keep-alive message from the edge enabler client resets an edge watchdog timer at the edge enabler server.

In some cases, the edge enabler server releases local caching resources associated with the one or more edge application clients based on the one or more edge application clients being deregistered. In some cases, the edge enabler server removes a registration for the UE based on the UE discontinuing communications for at least the predetermined time period.

In some cases, the feedback message includes an acknowledgment indication based on the UE determining that the connection between the edge application client and the edge application server is to be maintained. In some cases, the feedback message includes a negative acknowledgment indication based on the UE determining that the connection between the edge application client and the edge application server is to be released.

The edge application manager 825 may determine, after the transmitting, that one or more edge application clients at the UE have ceased operation. In some examples, the edge application manager 825 may discontinue transmitting further keep-alive messages responsive to the determining that the one or more edge application clients at the UE have ceased operation. In some examples, the edge application manager 825 may receive, from the edge enabler server, a confirmation message that the one or more edge application clients are to be deregistered at the edge enabler server. In some examples, the edge application manager 825 may transmit a feedback message to the edge enabler server responsive to the confirmation message.

In some cases, the feedback message provides an acknowledgment indication when the one or more edge application clients at the UE have ceased operation, and provides a negative acknowledgment when the one or more edge application clients at the UE have not ceased operation. In some cases, one or more edge application clients at the UE are automatically deregistered at the edge enabler server when the keep-alive message is not transmitted for a predetermined time period.

The resource manager 830 may manage resources associated with edge servers. In some cases, the edge enabler server terminates a registration and releases resources associated with the edge application client responsive to the negative acknowledgment indication.

Figure 9:
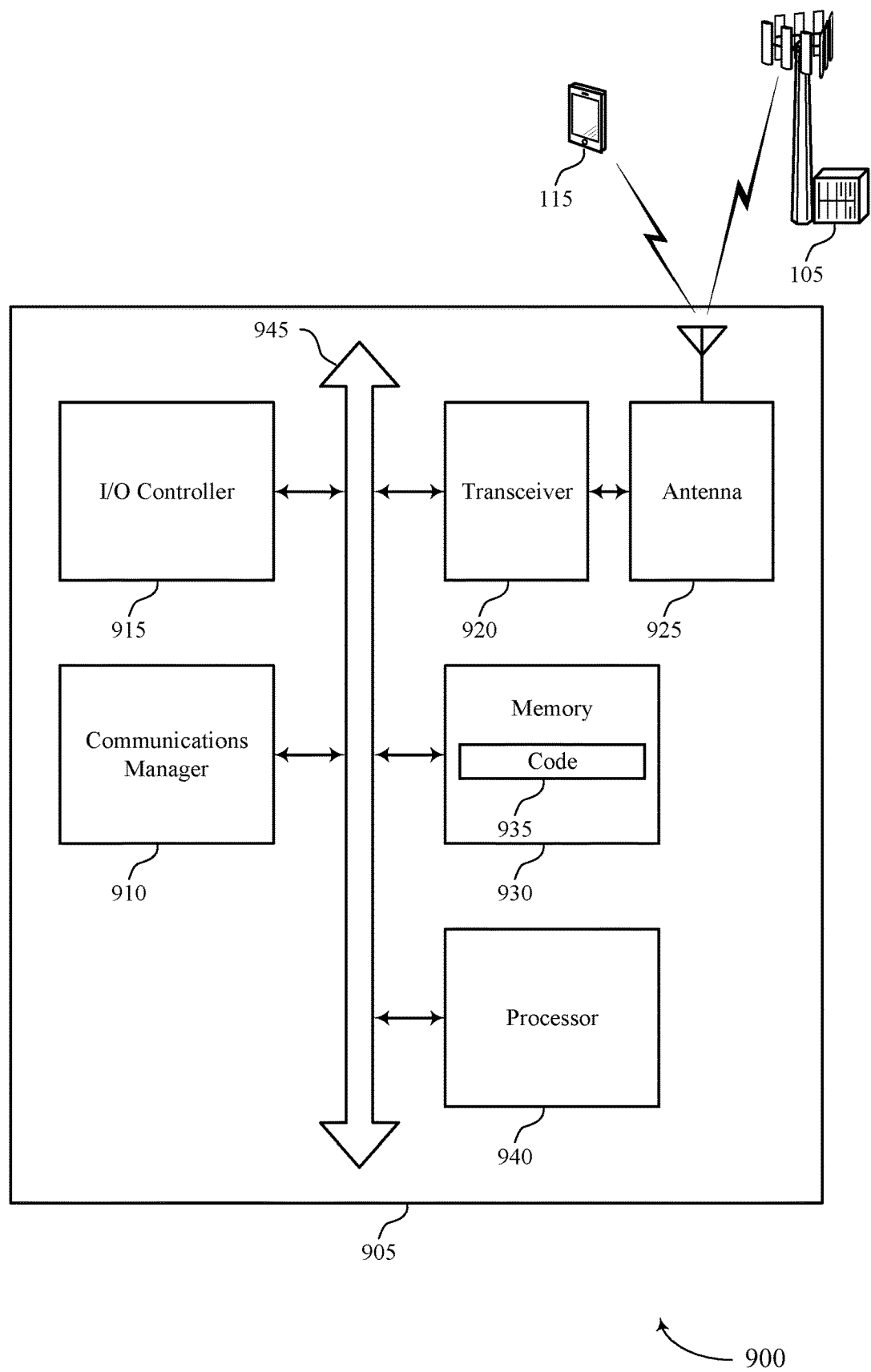
FIG. 9 shows a diagram of a system including a device that supports local cache management in edge networks in accordance with aspects of the present disclosure.

FIG. 9 shows a diagram of a system 900 including a device 905 that supports local cache management in edge networks in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may initiate, at an edge enabler client at the UE, a keep-alive timer for maintaining a connection with an edge application server in an edge data network, determine that the connection with the edge application server is to be maintained, and transmit, responsive to the determining and to an expiration of the keep-alive timer, a keep-alive message to an edge enabler server associated with the edge application server via a wireless communications network.

The communications manager 910 may also receive, at an edge enabler client at the UE via a wireless communications network, a keep-alive probe message from an edge enabler server at an edge data network, the keep-alive probe message for maintaining a connection between an edge application client at the UE and an edge application server in the edge data network, determine whether the connection between the edge application client and the edge application server is to be maintained, and transmit, responsive to the determining, a feedback message to the edge enabler server.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting local cache management in edge networks).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
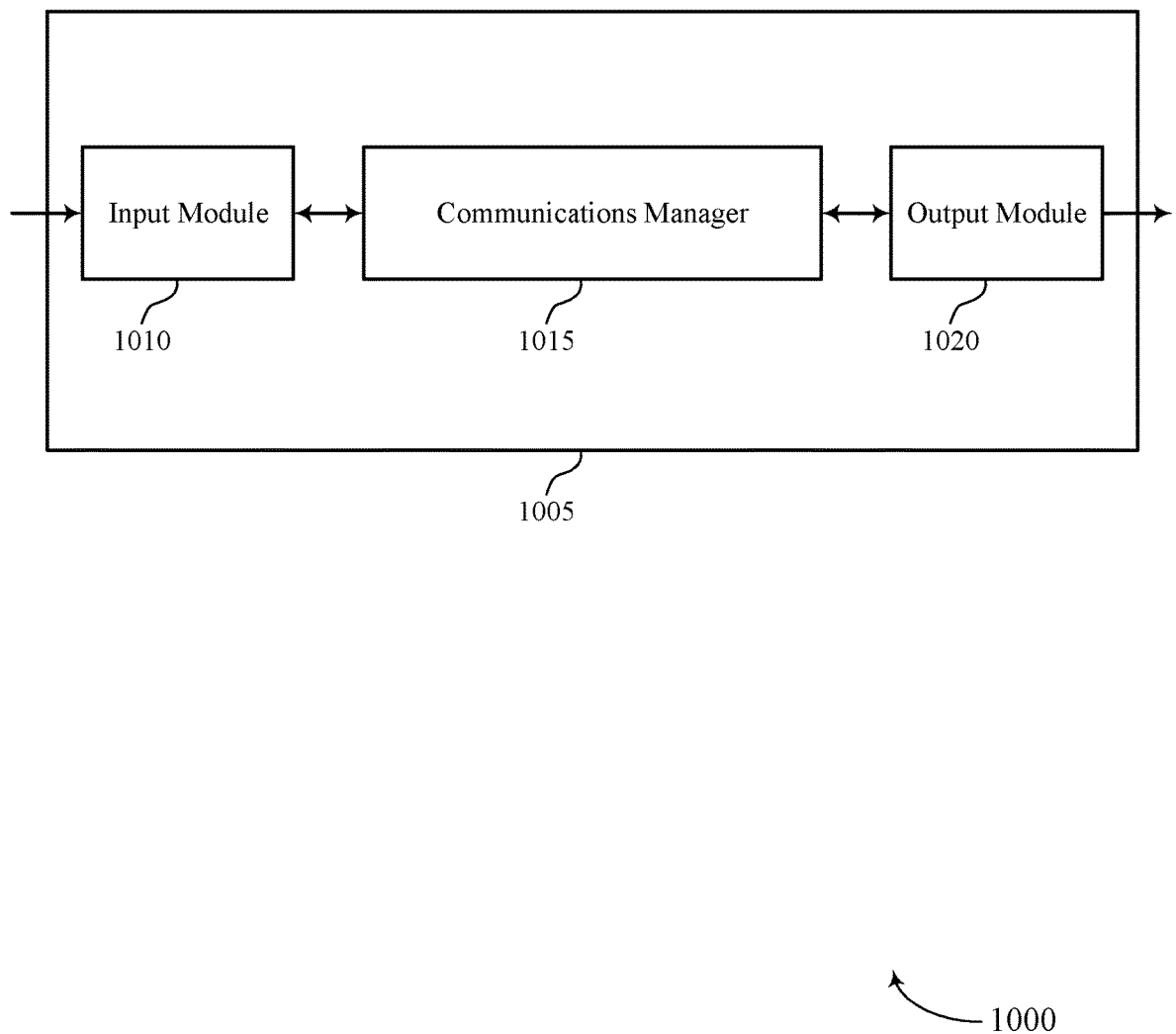
FIGS. 10 and 11 show block diagrams of devices that support local cache management in edge networks in accordance with aspects of the present disclosure.

FIG. 10 shows a block diagram 1000 of a device 1005 that supports local cache management in edge networks in accordance with aspects of the present disclosure. The device 1005 may be an example of aspects of an edge enabler server as described herein. The device 1005 may include an input module 1010, a communications manager 1015, and an output module 1020. The device 1005 may also include a processor. Each of these components may be in communication with one another (e.g., via one or more buses).

The input module 1010 may manage input signals for the apparatus 1005. For example, the input module 1010 may identify input signals based on an interaction with a modem, a keyboard, a mouse, a touchscreen, or a similar device. These input signals may be associated with user input or processing at other components or devices. In some cases, the input module 1010 may utilize an operating system such as iOS®, ANDROID®, MS-DOS®, MS-WINDOWS®, OS/2®, UNIX®, LINUX®, or another known operating system to handle input signals. The input module 1010 may send aspects of these input signals to other components of the apparatus 1005 for processing. For example, the input module 1010 may transmit input signals to the data retention module 1015 to support data retention handling for data object stores. In some cases, the input module 1010 may be a component of an input/output (I/O) controller 1315 as described with reference to FIG. 13.

The communications manager 1015 may register at least a first edge application client at a first UE for edge application services, initiate an edge watchdog timer associated with the first UE, reset the edge watchdog timer responsive to the receiving the keep-alive message, and receive, from the first UE via a wireless communications network, a keep-alive message.

The communications manager 1015 may also register at least a first edge application client at a first UE for edge application services, initiate an edge watchdog timer associated with the first UE, transmit, to the first UE via a wireless communications network, a keep-alive probe message prior to an expiration of the edge watchdog timer, determine whether to reset the edge watchdog timer based on the monitoring, and monitor, responsive to the transmitting the keep-alive probe message, for a feedback response from the first UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The output module 1020 may manage output signals for the apparatus 1005. For example, the output module 1020 may receive signals from other components of the apparatus 1005, such as the communications manager 1015, and may transmit these signals to other components or devices. In some specific examples, the output module 1020 may transmit output signals for transmission to an edge enabler client. In some cases, the output module 1020 may be a component of an I/O controller 1315 as described with reference to FIG. 13.

Figure 11:
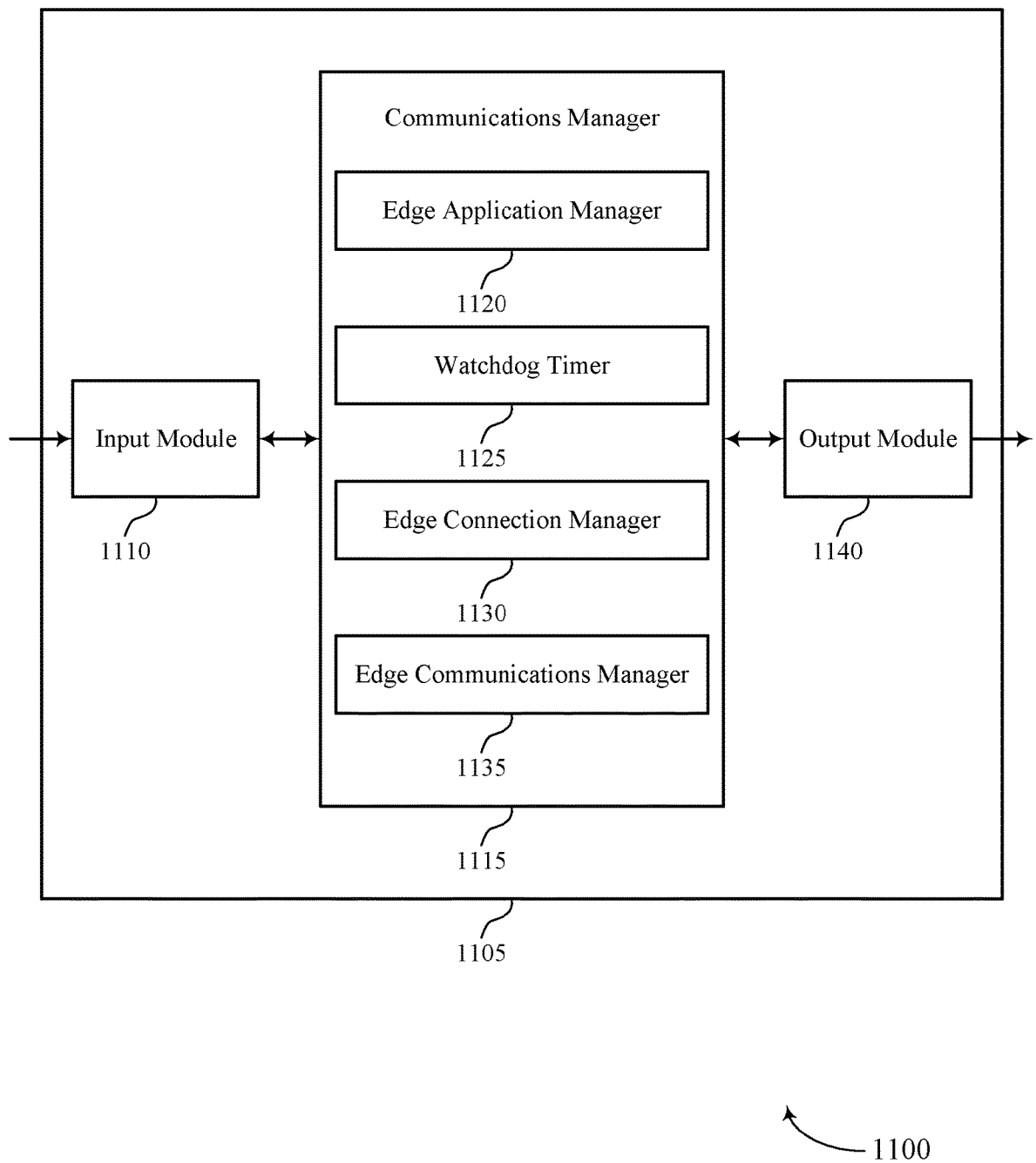

FIG. 11 shows a block diagram 1100 of an apparatus 1105 that supports local cache management in edge networks in accordance with aspects of the present disclosure. The device 1105 may be an example of aspects of a device 1005 or an edge enabler server as described herein. The apparatus 1105 may include an input module 1110, a communications manager 1115, and an output module 1140. The apparatus 1105 may also include a processor. Each of these components may be in communication with one another (e.g., via one or more buses). In some cases, the apparatus 1105 may be an example of a user terminal, a database server, or a system containing multiple computing devices.

The input module 1110 may manage input signals for the apparatus 1105. For example, the input module 1110 may manage edge data network signaling based on an interaction with a modem or network connection. These input signals may be associated with user input or processing at other components or devices. In some cases, the input module 1010 may utilize an operating system such as iOS®, ANDROID®, MS-DOS®, MS-WINDOWS®, OS/2®, UNIX®, LINUX®, or another known operating system to handle input signals. The input module 1110 may send aspects of these input signals to other components of the apparatus 1105 for processing. For example, the input module 1110 may transmit input signals to the communications manager 1115 to edge application client that support edge data network operations. In some cases, the input module 1110 may be a component of an input/output (I/O) controller 1315 as described with reference to FIG. 13.

The communications manager 1115 may be an example of aspects of the communications manager 1015 as described herein. The communications manager 1115 may include an edge application manager 1120, a watchdog timer 1125, an edge connection manager 1130, and an edge communications manager 1135. The communications manager 1115 may be an example of aspects of the communications manager 1205 or 1310 described with reference to FIGS. 12 and 13.

The communications manager 1115 and/or at least some of its various sub-components may be implemented in hardware, software executed by a processor, firmware, or any combination thereof. If implemented in software executed by a processor, the functions of the communications manager 1115 and/or at least some of its various sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. The communications manager 1115 and/or at least some of its various sub-components may be physically located at various positions, including being distributed such that portions of functions are implemented at different physical locations by one or more physical devices. In some examples, the communications manager 1115 and/or at least some of its various sub-components may be a separate and distinct component in accordance with various aspects of the present disclosure. In other examples, the communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, the edge application manager 1120 may register at least a first edge application client at a first UE for edge application services. The watchdog timer 1125 may initiate an edge watchdog timer associated with the first UE and reset the edge watchdog timer responsive to the receiving the keep-alive message. The edge connection manager 1130 may receive, from the first UE via a wireless communications network, a keep-alive message.

In other cases, the edge application manager 1120 may register at least a first edge application client at a first UE for edge application services. The watchdog timer 1125 may initiate an edge watchdog timer associated with the first UE.

The edge connection manager 1130 may transmit, to the first UE via a wireless communications network, a keep-alive probe message prior to an expiration of the edge watchdog timer and determine whether to reset the edge watchdog timer based on the monitoring.

The edge communications manager 1135 may monitor, responsive to the transmitting the keep-alive probe message, for a feedback response from the first UE.

The output module 1140 may manage output signals for the apparatus 1105. For example, the output module 1140 may receive signals from other components of the apparatus 1105, such as the data retention module 1115, and may transmit these signals to other components or devices. In some specific examples, the output module 1140 may transmit output signals for processing (e.g., at a UE). In some cases, the output module 1140 may be a component of an I/O controller 1315 as described with reference to FIG. 13.

Figure 12:
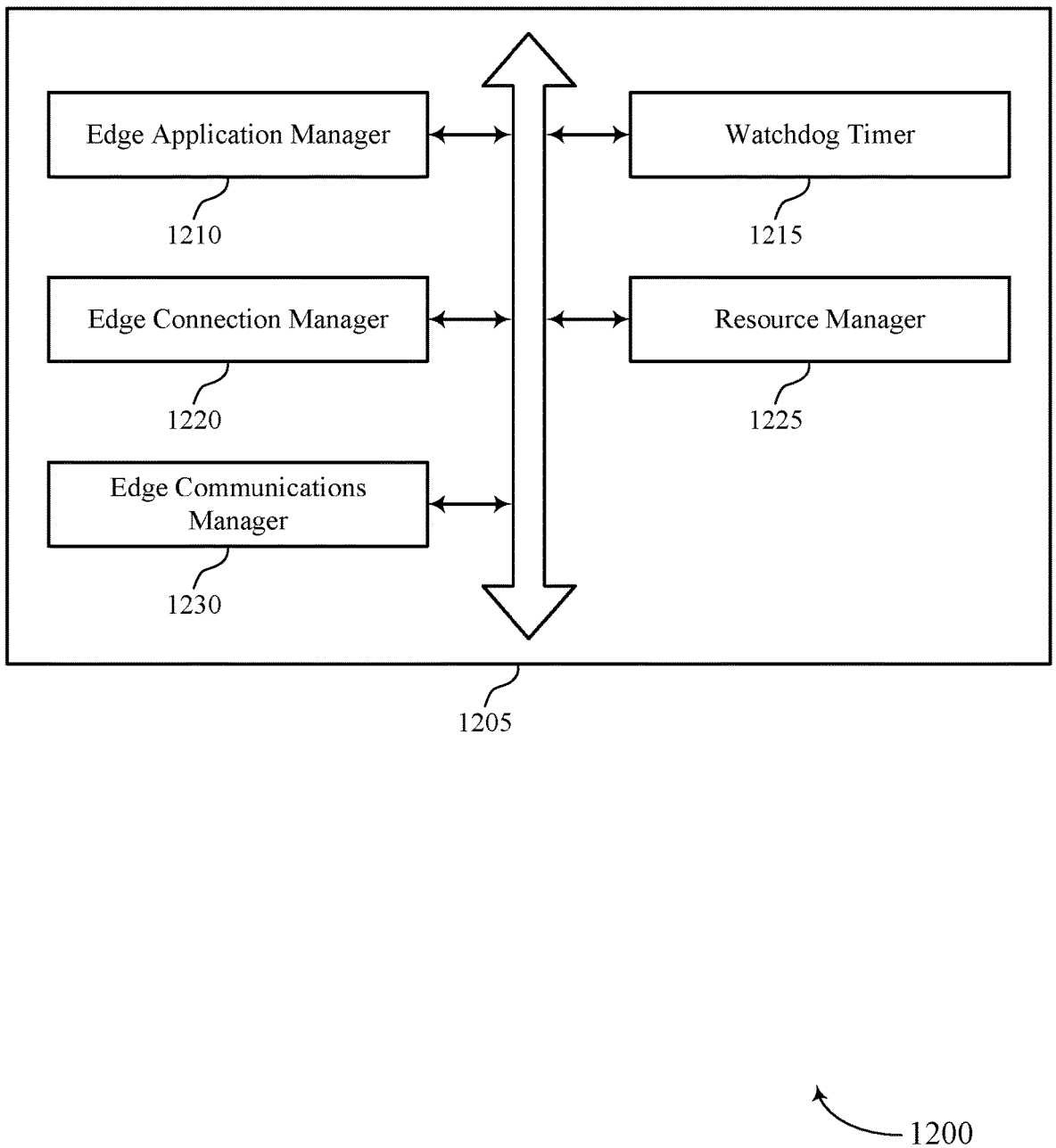
FIG. 12 shows a block diagram of a communications manager that supports local cache management in edge networks in accordance with aspects of the present disclosure.

FIG. 12 shows a block diagram 1200 of a communications manager 1205 that supports local cache management in edge networks in accordance with aspects of the present disclosure. The communications manager 1205 may be an example of aspects of a communications manager 1015, a communications manager 1115, or a communications manager 1310 described herein. The communications manager

1205 may include an edge application manager 1210, a watchdog timer 1215, an edge connection manager 1220, a resource manager 1225, and an edge communications manager 1230. Each of these modules may communicate, directly or indirectly, with one another (e.g., via one or more buses).

The edge application manager 1210 may register at least a first edge application client at a first UE for edge application services. In some examples, the edge application manager 1210 may register at least a first edge application client at a first UE for edge application services. The watchdog timer 1215 may initiate an edge watchdog timer associated with the first UE.

In some examples, the watchdog timer 1215 may reset the edge watchdog timer responsive to the receiving the keep-alive message. In some examples, the watchdog timer 1215 may reset the edge watchdog timer responsive the feedback response indicating an acknowledgment of the keep-alive probe message.

The edge connection manager 1220 may receive, from the first UE via a wireless communications network, a keep-alive message. In some examples, the edge connection manager 1220 may transmit, to the first UE via a wireless communications network, a keep-Attorney alive probe message prior to an expiration of the edge watchdog timer. In some examples, the edge connection manager 1220 may determine whether to reset the edge watchdog timer based on the monitoring.

In some examples, the edge connection manager 1220 may establish, with an edge enabler client at the first UE, an EDGE-1 connection with the edge enabler server, and where the registering is performed responsive to the establishing the EDGE-1 connection. In some examples, the edge connection manager 1220 may monitor for a subsequent keep-alive message from the first UE.

In some examples, the edge connection manager 1220 may determine that the edge watchdog timer has expired. In some examples, the edge connection manager 1220 may deregister the first edge application client responsive to the determining that the edge watchdog timer has expired. In some examples, the edge connection manager 1220 may transmit, prior to the deregistering, a confirmation message to the first UE that indicates the first edge application client is to be deregistered.

In some examples, the edge connection manager 1220 may receive a feedback message from the first UE responsive to the confirmation message.

In some cases, the keep-alive message is associated with a keep-alive timer at the first UE that triggers the keep-alive message prior to an expiration of the edge watchdog timer.

In some cases, the edge enabler server initiates the edge watchdog timer responsive to the EDGE-1 connection establishment.

In some cases, the feedback message provides an acknowledgment indication when the first edge application client at the first UE has ceased operation, and provides a negative acknowledgment when the first edge application client at the first UE have not ceased operation, and where the edge watchdog timer is reset responsive to the negative acknowledgment. In some cases, the edge enabler server terminates a registration and releases resources associated with the first edge application client responsive to the determining that no feedback response is received or that the negative acknowledgment feedback response is received from the UE.

The edge communications manager 1230 may monitor, responsive to the transmitting the keep-alive probe message, for a feedback response from the first UE. In some examples, the edge communications manager 1230 may receive the feedback response from the first UE. In some examples, the edge communications manager 1230 may determine that no feedback response is received from the UE prior to the expiration of the watchdog timer, or that a negative acknowledgment feedback response is received from the UE. In some examples, the edge communications manager 1230 may deregister the first edge application client at the first UE.

The resource manager 1225 may release local caching resources associated with the first edge application client responsive to the deregistering. In some examples, the resource manager 1225 may remove each of a set of edge application clients of the first UE based on the first UE discontinuing communications for a predetermined time period.

Figure 13:
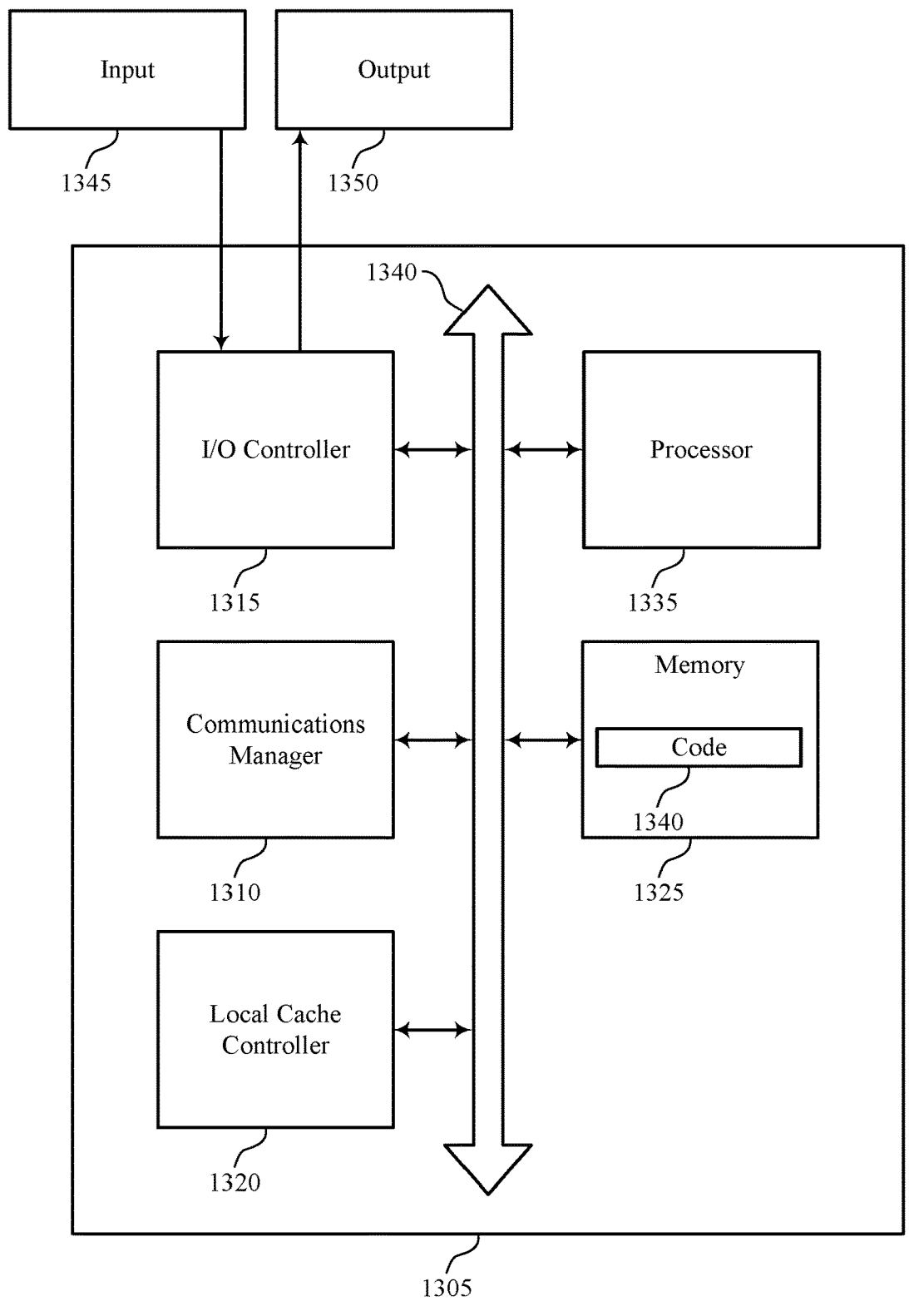
FIG. 13 shows a diagram of a system including a device that supports local cache management in edge networks in accordance with aspects of the present disclosure.

FIG. 13 shows a diagram of a system 1300 including a device 1305 that supports local cache management in edge networks in accordance with aspects of the present disclosure. The device 1305 may be an example of or include the components of an application server or an apparatus 1005, device 1105, or an edge enabler server as described herein. The device 1305 may include components for bi-directional data communications including components for transmitting and receiving communications, including a communications manager 1310, an I/O controller 1315, a local cache controller 1320, memory 1325, and a processor 1330. These components may be in electronic communication via one or more buses (e.g., bus 1340).

The communications manager 1310 may be an example of a communications manager 1115 or 1205 as described herein. For example, the communications manager 1310 may perform any of the methods or processes described above with reference to FIGS. 11 and 12. In some cases, the communications manager 1310 may be implemented in hardware, software executed by a processor, firmware, or any combination thereof.

The I/O controller 1315 may manage input signals 1345 and output signals 1350 for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The local cache controller 1320 may manage data storage and processing in a local cache within memory 1325. In some cases, the local cache controller 1320 may operate automatically without user interaction.

Memory 1325 may include random-access memory (RAM) and read-only memory (ROM). The memory 1325 may store computer-readable, computer-executable software including instructions that, when executed, cause the processor to perform various functions described herein. In some cases, the memory 1325 may contain, among other things, a basic input/output system (BIOS) which may control basic hardware or software operation such as the interaction with peripheral components or devices.

The processor 1330 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1330 may be configured to operate according to edge data networks. In other cases, a memory controller may be integrated into the processor 1330. The processor 1330 may be configured to execute computer-readable instructions stored in a memory 1325 to perform various functions (e.g., functions or tasks supporting local cache management in edge networks).

Figure 14:
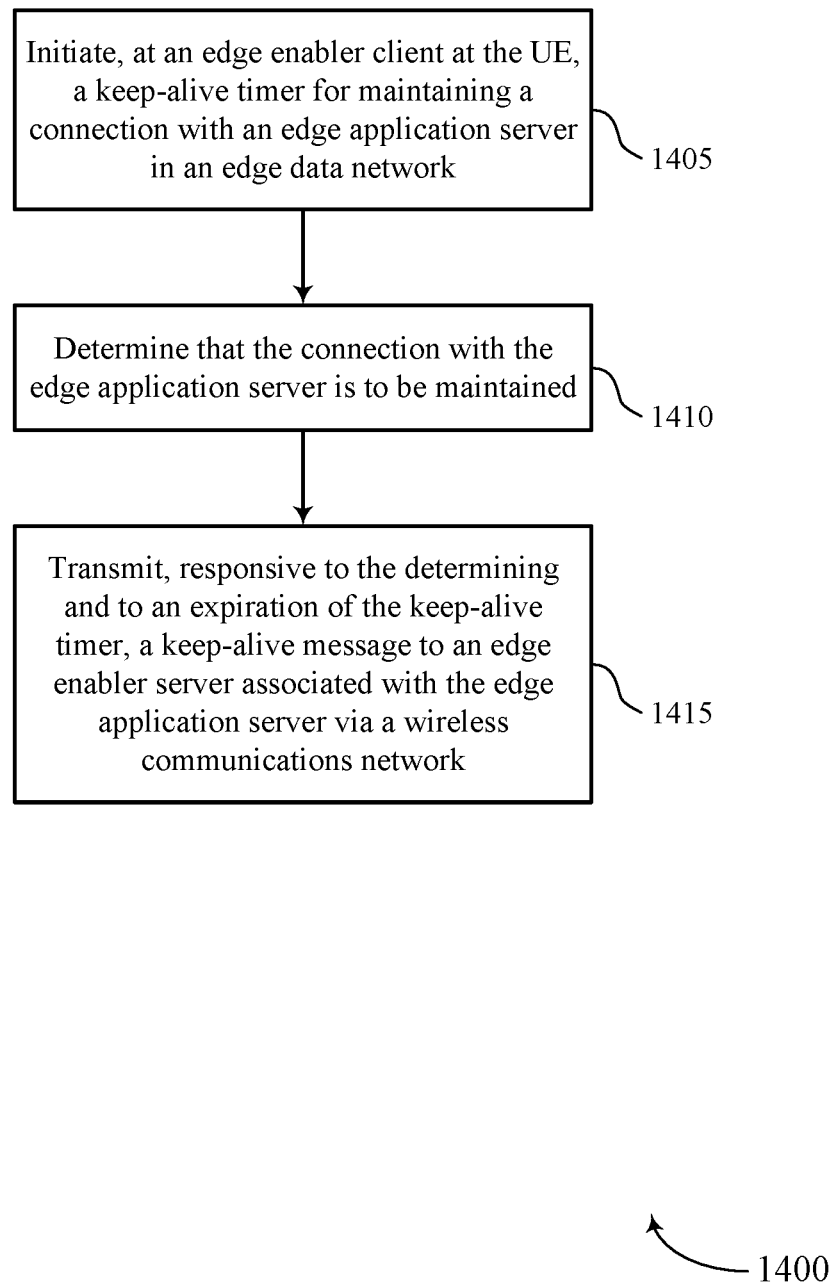
FIGS. 14 through 21 show flowcharts illustrating methods that support local cache management in edge networks in accordance with aspects of the present disclosure.

FIG. 14 shows a flowchart illustrating a method 1400 that supports local cache management in edge networks in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may initiate, at an edge enabler client at the UE, a keep-alive timer for maintaining a connection with an edge application server in an edge data network. The operations of 1405 may be performed according to the methods described herein. In some examples, aspects of the operations of 1405 may be performed by a keep-alive timer as described with reference to FIGS. 6 through 9.

At 1410, the UE may determine that the connection with the edge application server is to be maintained. The operations of 1410 may be performed according to the methods described herein. In some examples, aspects of the operations of 1410 may be performed by an edge connection manager as described with reference to FIGS. 6 through 9.

At 1415, the UE may transmit, responsive to the determining and to an expiration of the keep-alive timer, a keep-alive message to an edge enabler server associated with the edge application server via a wireless communications network. The operations of 1415 may be performed according to the methods described herein. In some examples, aspects of the operations of 1415 may be performed by an edge communications manager as described with reference to FIGS. 6 through 9.

Figure 15:
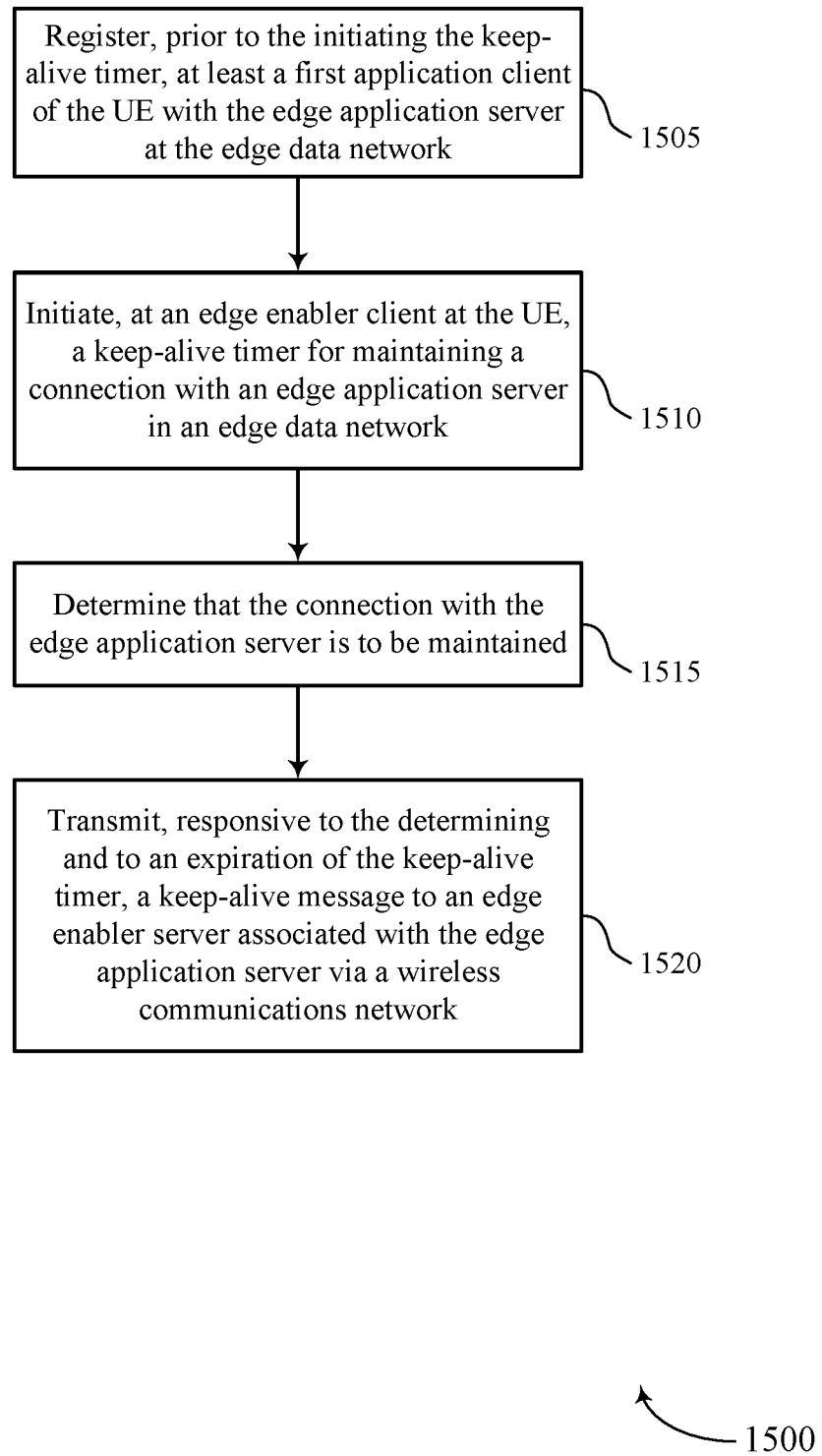

FIG. 15 shows a flowchart illustrating a method 1500 that supports local cache management in edge networks in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may register, prior to the initiating the keep-alive timer, at least a first application client of the UE with the edge application server at the edge data network. The operations of 1505 may be performed according to the methods described herein. In some examples, aspects of the operations of 1505 may be performed by an edge communications manager as described with reference to FIGS. 6 through 9.

At 1510, the UE may initiate, at an edge enabler client at the UE, a keep-alive timer for maintaining a connection with an edge application server in an edge data network. The operations of 1510 may be performed according to the methods described herein. In some examples, aspects of the operations of 1510 may be performed by a keep-alive timer as described with reference to FIGS. 6 through 9. In some cases, the initiating the keep-alive timer is performed responsive to the registering.

At 1515, the UE may determine that the connection with the edge application server is to be maintained. The operations of 1515 may be performed according to the methods described herein. In some examples, aspects of the operations of 1515 may be performed by an edge connection manager as described with reference to FIGS. 6 through 9.

At 1520, the UE may transmit, responsive to the determining and to an expiration of the keep-alive timer, a keep-alive message to an edge enabler server associated with the edge application server via a wireless communications network. The operations of 1520 may be performed according to the methods described herein. In some examples, aspects of the operations of 1520 may be performed by an edge communications manager as described with reference to FIGS. 6 through 9.

Figure 16:
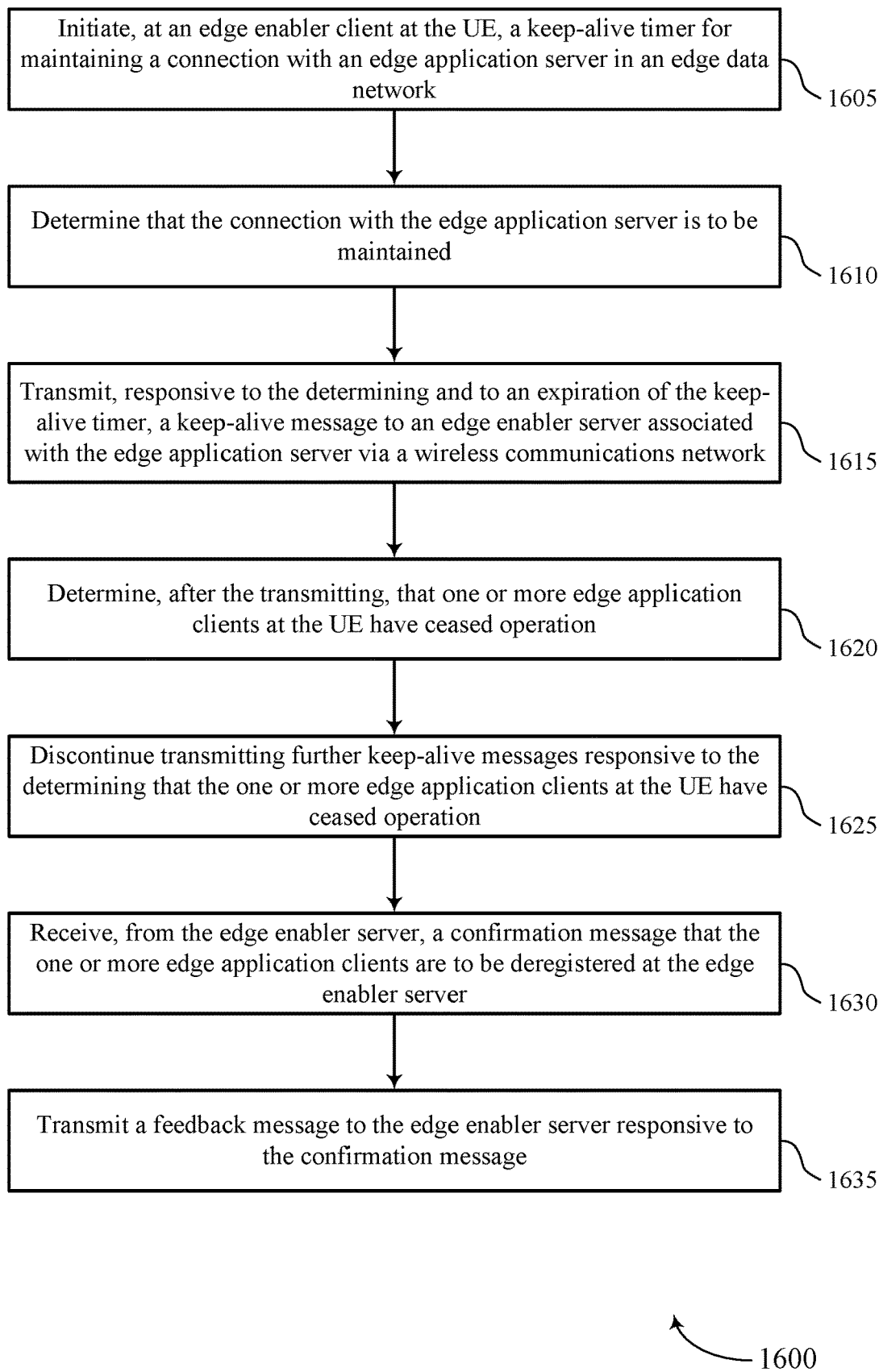

FIG. 16 shows a flowchart illustrating a method 1600 that supports local cache management in edge networks in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may initiate, at an edge enabler client at the UE, a keep-alive timer for maintaining a connection with an edge application server in an edge data network. The operations of 1605 may be performed according to the methods described herein. In some examples, aspects of the operations of 1605 may be performed by a keep-alive timer as described with reference to FIGS. 6 through 9.

At 1610, the UE may determine that the connection with the edge application server is to be maintained. The operations of 1610 may be performed according to the methods described herein. In some examples, aspects of the operations of 1610 may be performed by an edge connection manager as described with reference to FIGS. 6 through 9.

At 1615, the UE may transmit, responsive to the determining and to an expiration of the keep-alive timer, a keep-alive message to an edge enabler server associated with the edge application server via a wireless communications network. The operations of 1615 may be performed according to the methods described herein. In some examples, aspects of the operations of 1615 may be performed by an edge communications manager as described with reference to FIGS. 6 through 9.

At 1620, the UE may determine, after the transmitting, that one or more edge application clients at the UE have ceased operation. The operations of 1620 may be performed according to the methods described herein. In some examples, aspects of the operations of 1620 may be performed by an edge application manager as described with reference to FIGS. 6 through 9.

At 1625, the UE may discontinue transmitting further keep-alive messages responsive to the determining that the one or more edge application clients at the UE have ceased operation. The operations of 1625 may be performed according to the methods described herein. In some examples, aspects of the operations of 1625 may be performed by an edge application manager as described with reference to FIGS. 6 through 9.

At 1630, the UE may receive, from the edge enabler server, a confirmation message that the one or more edge application clients are to be deregistered at the edge enabler server. The operations of 1630 may be performed according to the methods described herein. In some examples, aspects of the operations of 1630 may be performed by an edge application manager as described with reference to FIGS. 6 through 9.

At 1635, the UE may transmit a feedback message to the edge enabler server responsive to the confirmation message. The operations of 1635 may be performed according to the methods described herein. In some examples, aspects of the operations of 1635 may be performed by an edge application manager as described with reference to FIGS. 6 through 9.

Figure 17:
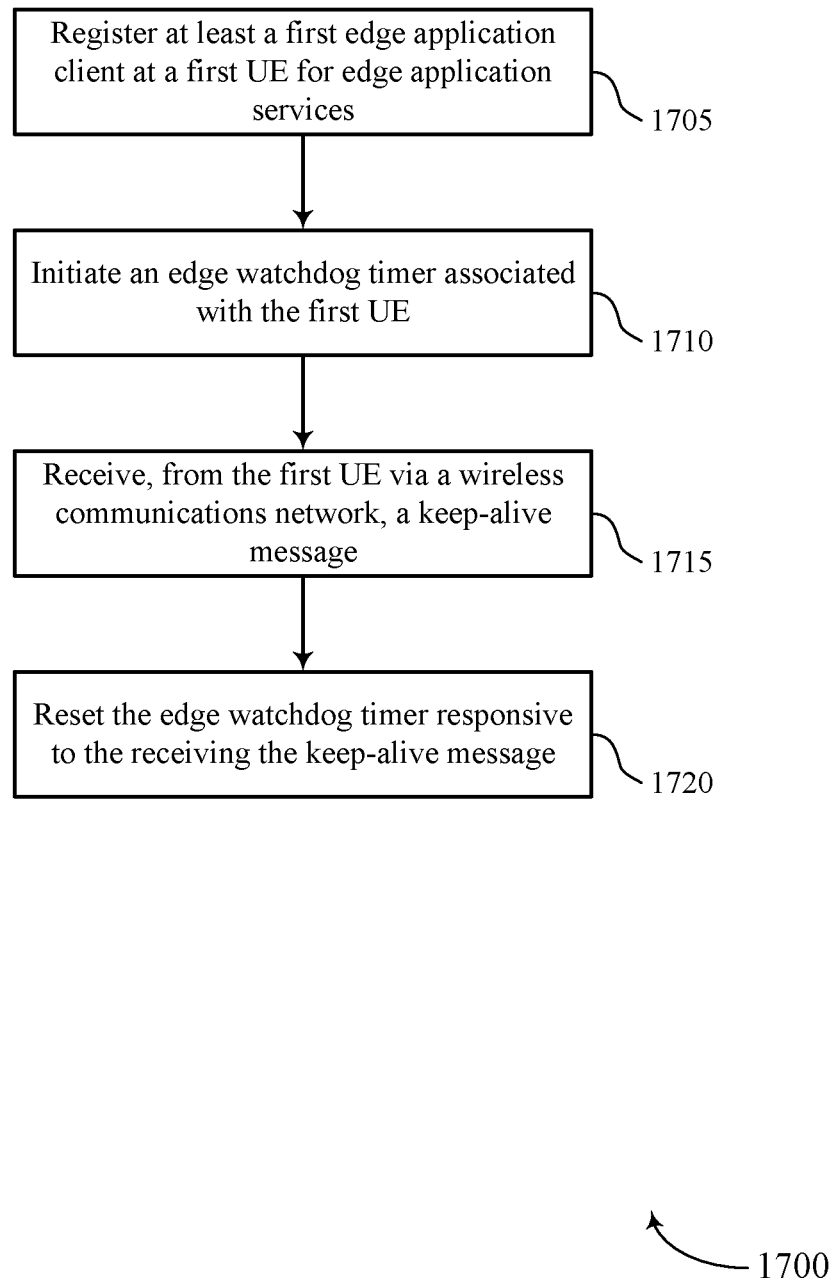

FIG. 17 shows a flowchart illustrating a method 1700 that supports local cache management in edge networks in accordance with aspects of the present disclosure. The operations of method 1700 may be implemented by an application server or its components as described herein. For example, the operations of method 1700 may be performed by a communications manager as described with reference to FIGS. 10 through 13. In some examples, an application server may execute a set of instructions to control the functional elements of the application server to perform the functions described below. Additionally or alternatively, an application server may perform aspects of the functions described below using special-purpose hardware.

At 1705, the application server may register at least a first edge application client at a first UE for edge application services. The operations of 1705 may be performed according to the methods described herein. In some examples, aspects of the operations of 1705 may be performed by an edge application manager as described with reference to FIGS. 10 through 13.

At 1710, the application server may initiate an edge watchdog timer associated with the first UE. The operations of 1710 may be performed according to the methods described herein. In some examples, aspects of the operations of 1710 may be performed by a watchdog timer as described with reference to FIGS. 10 through 13.

At 1715, the application server may receive, from the first UE via a wireless communications network, a keep-alive message. The operations of 1715 may be performed according to the methods described herein. In some examples, aspects of the operations of 1715 may be performed by an edge connection manager as described with reference to FIGS. 10 through 13.

At 1720, the application server may reset the edge watchdog timer responsive to the receiving the keep-alive message. The operations of 1720 may be performed according to the methods described herein. In some examples, aspects of the operations of 1720 may be performed by a watchdog timer as described with reference to FIGS. 10 through 13.

Figure 18:
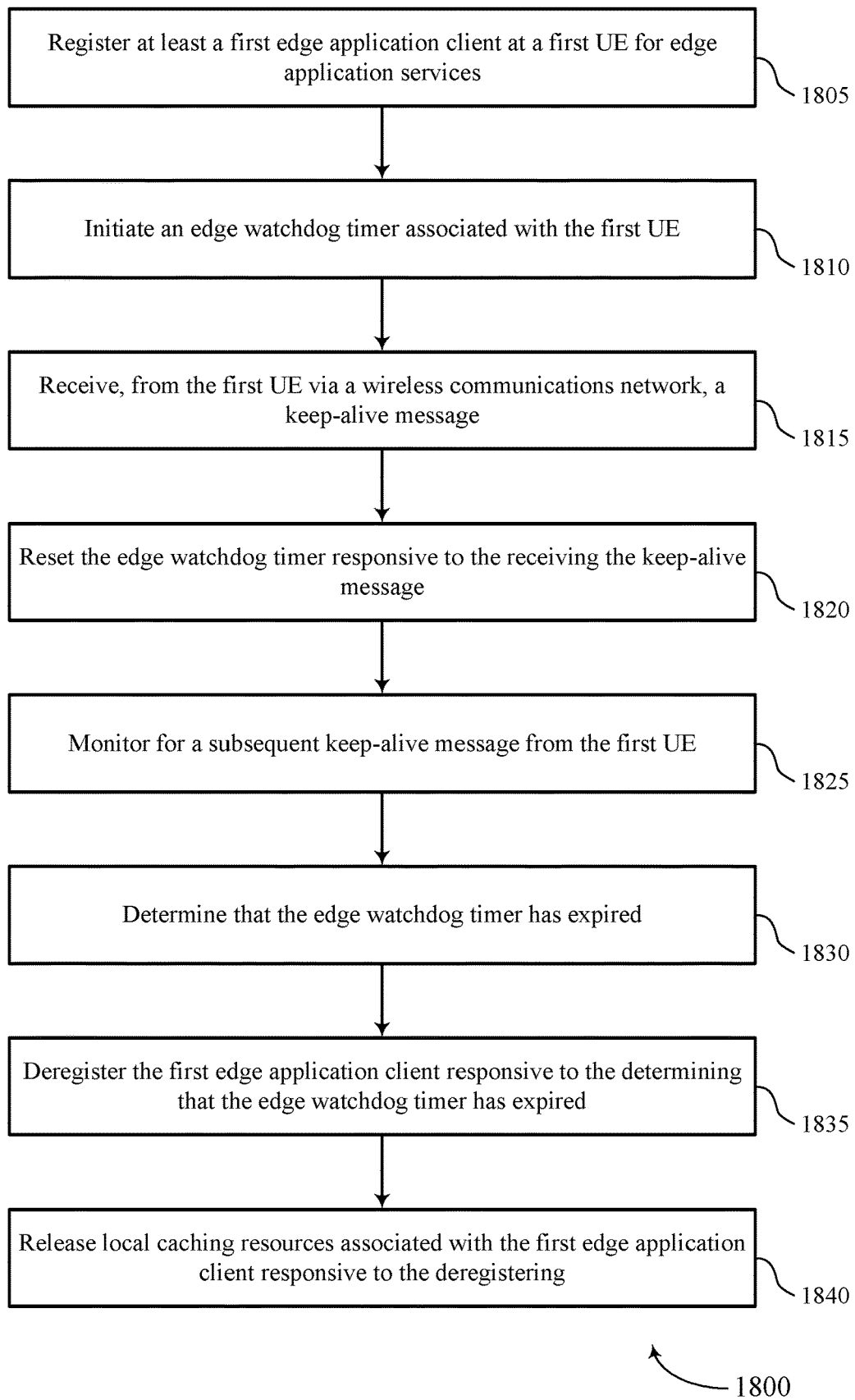

FIG. 18 shows a flowchart illustrating a method 1800 that supports local cache management in edge networks in accordance with aspects of the present disclosure. The operations of method 1800 may be implemented by an application server or its components as described herein. For example, the operations of method 1800 may be performed by a communications manager as described with reference to FIGS. 10 through 13. In some examples, an application server may execute a set of instructions to control the functional elements of the application server to perform the functions described below. Additionally or alternatively, an application server may perform aspects of the functions described below using special-purpose hardware.

At 1805, the application server may register at least a first edge application client at a first UE for edge application services. The operations of 1805 may be performed according to the methods described herein. In some examples, aspects of the operations of 1805 may be performed by an edge application manager as described with reference to FIGS. 10 through 13.

At 1810, the application server may initiate an edge watchdog timer associated with the first UE. The operations of 1810 may be performed according to the methods described herein. In some examples, aspects of the operations of 1810 may be performed by a watchdog timer as described with reference to FIGS. 10 through 13.

At 1815, the application server may receive, from the first UE via a wireless communications network, a keep-alive message. The operations of 1815 may be performed according to the methods described herein. In some examples, aspects of the operations of 1815 may be performed by an edge connection manager as described with reference to FIGS. 10 through 13.

At 1820, the application server may reset the edge watchdog timer responsive to the receiving the keep-alive message. The operations of 1820 may be performed according to the methods described herein. In some examples, aspects of the operations of 1820 may be performed by a watchdog timer as described with reference to FIGS. 10 through 13.

At 1825, the application server may monitor for a subsequent keep-alive message from the first UE. The operations of 1825 may be performed according to the methods described herein. In some examples, aspects of the operations of 1825 may be performed by an edge connection manager as described with reference to FIGS. 10 through 13.

At 1830, the application server may determine that the edge watchdog timer has expired. The operations of 1830 may be performed according to the methods described herein. In some examples, aspects of the operations of 1830 may be performed by an edge connection manager as described with reference to FIGS. 10 through 13.

At 1835, the application server may deregister the first edge application client responsive to the determining that the edge watchdog timer has expired. The operations of 1835 may be performed according to the methods described herein. In some examples, aspects of the operations of 1835 may be performed by an edge connection manager as described with reference to FIGS. 10 through 13.

At 1840, the application server may release local caching resources associated with the first edge application client responsive to the deregistering. The operations of 1840 may be performed according to the methods described herein. In some examples, aspects of the operations of 1840 may be performed by a resource manager as described with reference to FIGS. 10 through 13.

Figure 19:
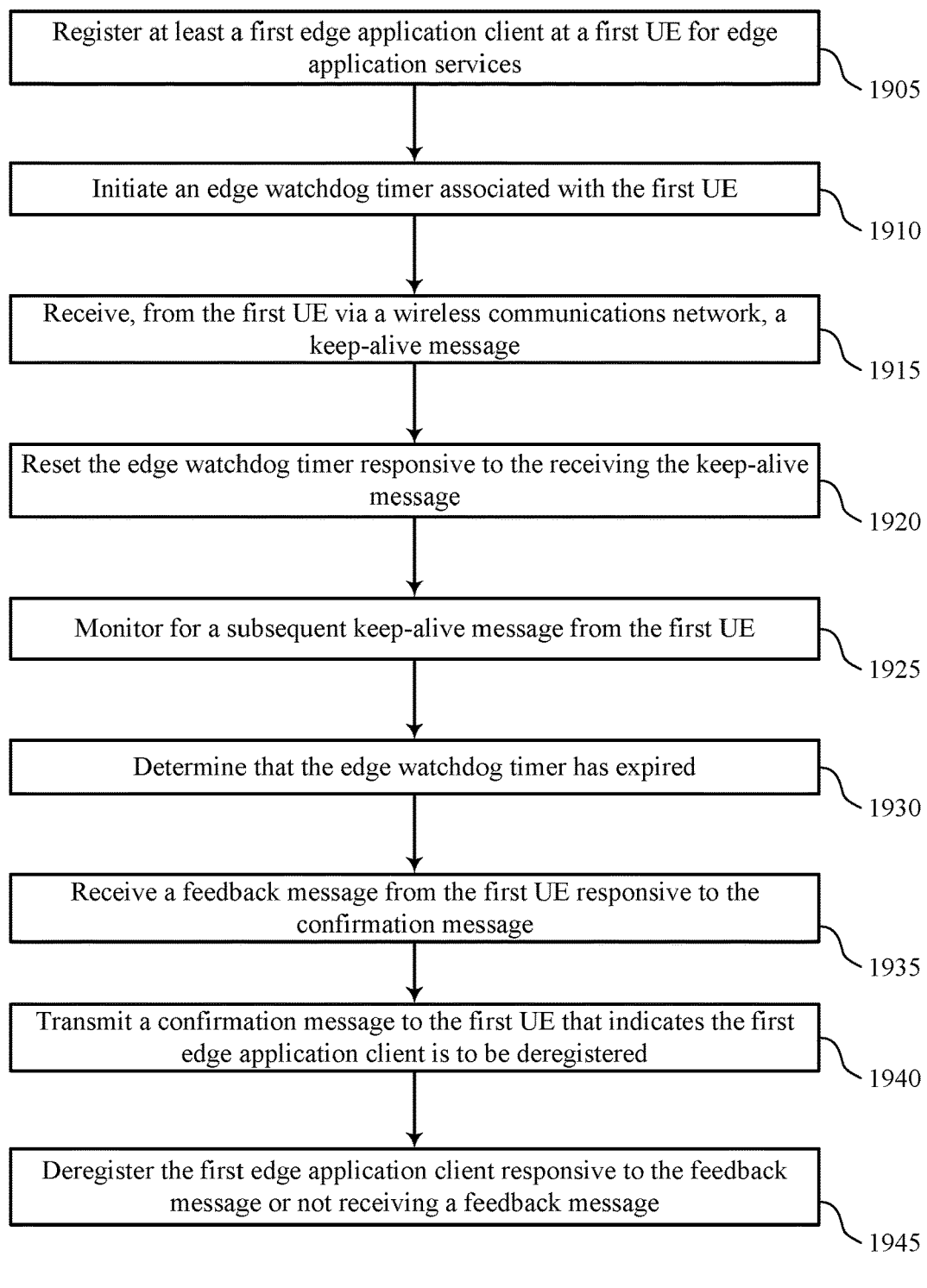

FIG. 19 shows a flowchart illustrating a method 1900 that supports local cache management in edge networks in accordance with aspects of the present disclosure. The operations of method 1900 may be implemented by an application server or its components as described herein. For example, the operations of method 1900 may be performed by a communications manager as described with reference to FIGS. 10 through 13. In some examples, an application server may execute a set of instructions to control the functional elements of the application server to perform the functions described below. Additionally or alternatively, an application server may perform aspects of the functions described below using special-purpose hardware.

At 1905, the application server may register at least a first edge application client at a first UE for edge application services. The operations of 1905 may be performed according to the methods described herein. In some examples, aspects of the operations of 1905 may be performed by an edge application manager as described with reference to FIGS. 10 through 13.

At 1910, the application server may initiate an edge watchdog timer associated with the first UE. The operations of 1910 may be performed according to the methods described herein. In some examples, aspects of the operations of 1910 may be performed by a watchdog timer as described with reference to FIGS. 10 through 13.

At 1915, the application server may receive, from the first UE via a wireless communications network, a keep-alive message. The operations of 1915 may be performed according to the methods described herein. In some examples, aspects of the operations of 1915 may be performed by an edge connection manager as described with reference to FIGS. 10 through 13.

At 1920, the application server may reset the edge watchdog timer responsive to the receiving the keep-alive message. The operations of 1920 may be performed according to the methods described herein. In some examples, aspects of the operations of 1920 may be performed by a watchdog timer as described with reference to FIGS. 10 through 13.

At 1925, the application server may monitor for a subsequent keep-alive message from the first UE. The operations of 1925 may be performed according to the methods described herein. In some examples, aspects of the operations of 1925 may be performed by an edge connection manager as described with reference to FIGS. 10 through 13.

At 1930, the application server may determine that the edge watchdog timer has expired. The operations of 1930 may be performed according to the methods described herein. In some examples, aspects of the operations of 1930 may be performed by an edge connection manager as described with reference to FIGS. 10 through 13.

At 1935, the application server may transmit, prior to the deregistering, a confirmation message to the first UE that indicates the first edge application client is to be deregistered. The operations of 1935 may be performed according to the methods described herein. In some examples, aspects of the operations of 1935 may be performed by an edge connection manager as described with reference to FIGS. 10 through 13.

At 1940, the application server may receive a feedback message from the first UE responsive to the confirmation message. The operations of 1940 may be performed according to the methods described herein. In some examples, aspects of the operations of 1940 may be performed by an edge connection manager as described with reference to FIGS. 10 through 13.

At 1945, the application server may deregister the first edge application client responsive to the feedback message or not receiving a feedback message. The operations of 1945 may be performed according to the methods described herein. In some examples, aspects of the operations of 1945 may be performed by an edge connection manager as described with reference to FIGS. 10 through 13.

Figure 20:
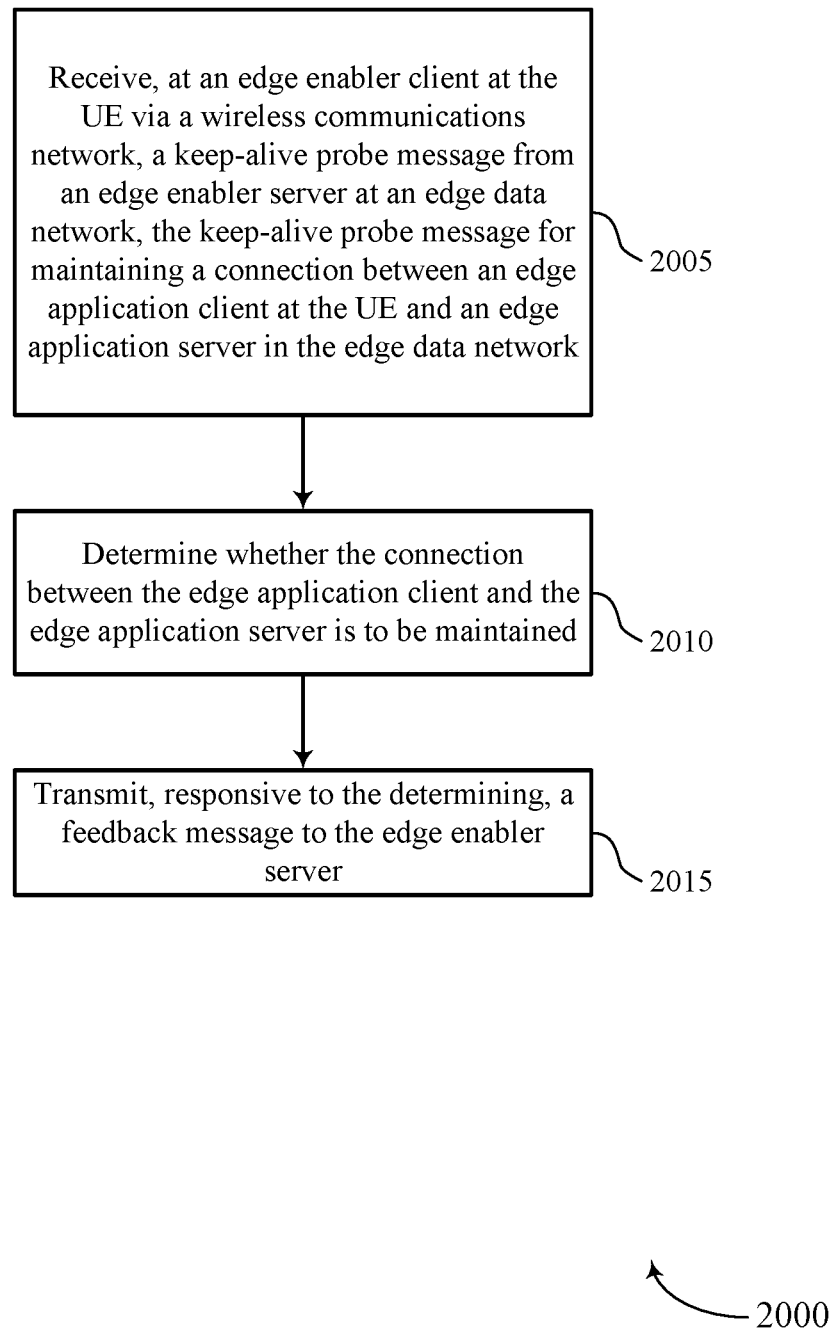

FIG. 20 shows a flowchart illustrating a method 2000 that supports local cache management in edge networks in accordance with aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may receive, at an edge enabler client at the UE via a wireless communications network, a keep-alive probe message from an edge enabler server at an edge data network, the keep-alive probe message for maintaining a connection between an edge application client at the UE and an edge application server in the edge data network. The operations of 2005 may be performed according to the methods described herein. In some examples, aspects of the operations of 2005 may be performed by an edge connection manager as described with reference to FIGS. 6 through 9.

At 2010, the UE may determine whether the connection between the edge application client and the edge application server is to be maintained. The operations of 2010 may be performed according to the methods described herein. In some examples, aspects of the operations of 2010 may be performed by an edge connection manager as described with reference to FIGS. 6 through 9.

At 2015, the UE may transmit, responsive to the determining, a feedback message to the edge enabler server. The operations of 2015 may be performed according to the methods described herein. In some examples, aspects of the operations of 2015 may be performed by an edge communications manager as described with reference to FIGS. 6 through 9.

Figure 21:
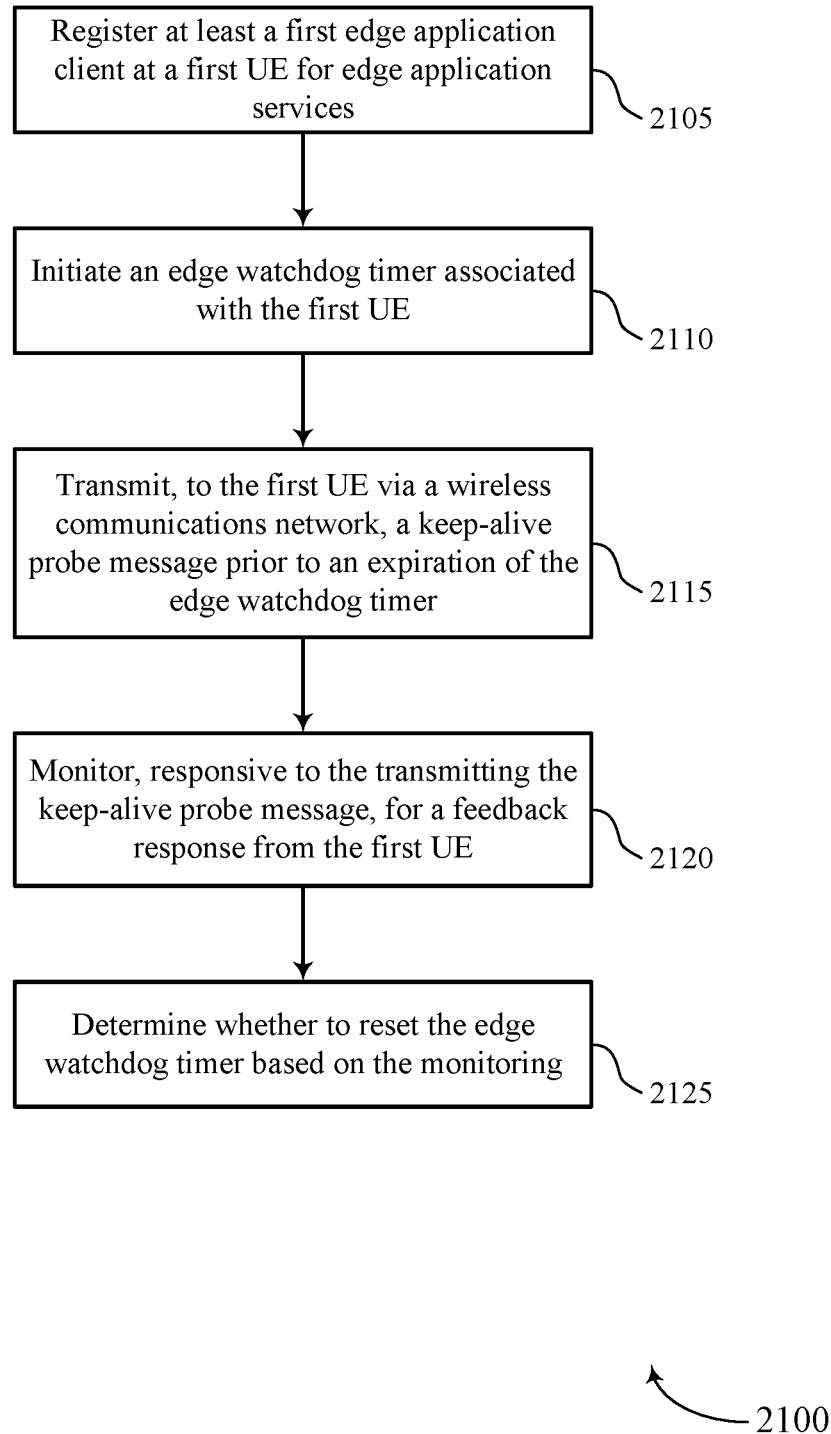

FIG. 21 shows a flowchart illustrating a method 2100 that supports local cache management in edge networks in accordance with aspects of the present disclosure. The operations of method 2100 may be implemented by an application server or its components as described herein. For example, the operations of method 2100 may be performed by a communications manager as described with reference to FIGS. 10 through 13. In some examples, an application server may execute a set of instructions to control the functional elements of the application server to perform the functions described below. Additionally or alternatively, an application server may perform aspects of the functions described below using special-purpose hardware.

At 2105, the application server may register at least a first edge application client at a first UE for edge application services. The operations of 2105 may be performed according to the methods described herein. In some examples, aspects of the operations of 2105 may be performed by an edge application manager as described with reference to FIGS. 10 through 13.

At 2110, the application server may initiate an edge watchdog timer associated with the first UE. The operations of 2110 may be performed according to the methods described herein. In some examples, aspects of the operations of 2110 may be performed by a watchdog timer as described with reference to FIGS. 10 through 13.

At 2115, the application server may transmit, to the first UE via a wireless communications network, a keep-alive probe message prior to an expiration of the edge watchdog timer. The operations of 2115 may be performed according to the methods described herein. In some examples, aspects of the operations of 2115 may be performed by an edge connection manager as described with reference to FIGS. 10 through 13.

At 2120, the application server may monitor, responsive to the transmitting the keep-alive probe message, for a feedback response from the first UE. The operations of 2120 may be performed according to the methods described herein. In some examples, aspects of the operations of 2120 may be performed by an edge communications manager as described with reference to FIGS. 10 through 13.

At 2125, the application server may determine whether to reset the edge watchdog timer based on the monitoring. The operations of 2125 may be performed according to the methods described herein. In some examples, aspects of the operations of 2125 may be performed by an edge connection manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   initiating a connection between, an edge enabler client at the UE and an edge enabler server in an edge data network, the connection being established through an EDGE-1 interface of the edge data network via a Third Generation Partnership Protocol (3GPP) network, the connection having an expiration time at which the connection is de-registered, wherein the edge data network provides application services for one or more UE application clients of a plurality of UEs, and edge application server of the edge data network provides one or more of processing resources or local caching resources for the one or more UE application clients; and
   transmitting, via the 3GPP network prior to the expiration time, an update indication to the edge enabler server to maintain the connection, the edge enabler server being associated with the edge application server.

2. The method of claim 1, further comprising:
   initiating a keep-alive timer for maintaining the connection with the edge enabler server, wherein the keep-alive timer is associated with a watchdog timer at the edge enabler server.

3. The method of claim 2, wherein the keep-alive timer provides that the update indication is transmitted before an expiration of the watchdog timer at the edge enabler server.

4. The method of claim 2, further comprising:
   registering, prior to the initiating the keep-alive timer, at least a first application client of the UE with the edge application server at the edge data network, and wherein the initiating the keep-alive timer is performed responsive to the registering.

5. The method of claim 4, further comprising:
   establishing, at the edge enabler client prior to the registering, an EDGE-1 connection with the edge enabler server, and wherein the registering is performed responsive to the establishing the EDGE-1 connection.

6. The method of claim 5, wherein the edge enabler server initiates an edge watchdog timer responsive to the EDGE-1 connection establishment.

7. The method of claim 1, wherein the update indication from the edge enabler client resets the expiration time at which the connection is de-registered at the edge enabler server.

8. The method of claim 1, further comprising:
   determining, after the transmitting, that one or more edge application clients at the UE have ceased operation; and
   discontinuing transmitting further update indications responsive to the determining that the one or more edge application clients at the UE have ceased operation.

9. The method of claim 8, further comprising:
   receiving, from the edge enabler server, a confirmation message that the one or more edge application clients are to be deregistered at the edge enabler server; and
   transmitting a feedback message to the edge enabler server responsive to the confirmation message.

10. The method of claim 9, wherein the feedback message provides an acknowledgment indication when the one or more edge application clients at the UE have ceased operation, and provides a negative acknowledgment when the one or more edge application clients at the UE have not ceased operation.

11. The method of claim 1, further comprising:
    receiving, from the edge enabler server, a stop notification from each of one or more edge application clients running at the UE; and
    discontinuing transmitting further update indications responsive to the receiving.

12. The method of claim 1, further comprising:
  determining that the UE has moved outside of an area associated with one or more edge application servers that are serving one or more associated edge application clients at the UE; and
  discontinuing transmitting further update indications responsive to the determining that the UE has moved outside of the area.

13. The method of claim 1, wherein one or more edge application clients at the UE are automatically deregistered at the edge enabler server when the update indication is not transmitted for a predetermined time period.

14. The method of claim 13, wherein the edge enabler server releases local caching resources associated with the one or more edge application clients based on the edge application client being relocated, based on the one or more edge application clients being deregistered, or based on the UE discontinuing communications for at least the predetermined time period.

15. A method for wireless communication at an edge enabler server of an edge data network, comprising:
  registering at least a first edge application client at a first UE for edge application services responsive to establishment of an EDGE-1 connection with the first edge application client, wherein the edge data network provides application services for one or more UE application clients of a plurality of UEs, and the edge application services provide one or more of processing resources or local caching resources for the first UE, and wherein the edge data network is accessed by the plurality of UEs via a Third Generation Partnership Protocol (3GPP) network;
  identifying an expiration time associated with the registration of the first edge application client at the first UE;
  receiving, from the first UE via the 3GPP network, an update indication; and
  resetting the expiration time responsive to receiving the update indication.

16. The method of claim 15, wherein the update indication is associated with a keep-alive timer at the first UE that triggers the update indication prior to the expiration time.

17. The method of claim 15, wherein the registering further comprises:
  establishing, with an edge enabler client at the first UE, the EDGE-1 connection with the edge enabler server.

18. The method of claim 15, further comprising:
  monitoring for a subsequent update indication from the first UE;
  determining that the expiration time has elapsed; and
  deregistering the first edge application client responsive to the determining that the expiration time has elapsed.

19. The method of claim 18, further comprising:
  releasing local caching resources associated with the first edge application client responsive to the deregistering.

20. The method of claim 18, further comprising:
  removing each of a plurality of edge application clients of the first UE based at least in part on the first UE discontinuing communications for a predetermined time period.

21. An apparatus for wireless communication at a user equipment (UE), comprising: a processor, memory coupled with the processor; and instructions stored in the memory and executable by the processor to cause the apparatus to:
  initiate a connection between an edge enabler client at the UE and an edge enabler server in an edge data network via a Third Generation Partnership Protocol (3GPP) network, the connection having an expiration time at which the connection is de-registered, wherein the edge data network provides application services for one or more UE application clients of a plurality of UEs, and an edge application server of the edge data network provides one or more of processing resources or local caching resources for the one or more UE application clients; and
  transmit, via the 3GPP network prior to the expiration time, an update indication to the edge enabler server to maintain the connection, the edge enabler server being associated with the edge application server.

22. The apparatus of claim 21, wherein the instructions are further executable by the processor to cause the apparatus to:
  initiate a keep-alive timer for maintaining the connection with the edge enabler server, wherein the keep-alive timer is associated with a watchdog timer at the edge enabler server, and wherein the keep-alive timer provides that the update indication is transmitted before an expiration of the watchdog timer at the edge enabler server.

23. The apparatus of claim 22, wherein the instructions are further executable by the processor to cause the apparatus to:
  register, prior to the initiating the keep-alive timer, at least a first application client of the UE with the edge application server at the edge data network, and wherein the initiating the keep-alive timer is performed responsive to the registering.

24. The apparatus of claim 21, wherein the instructions are further executable by the processor to cause the apparatus to:
  determine, after the transmitting, that one or more edge application clients at the UE have ceased operation; and
  discontinue transmission of further update indications responsive to determining that the one or more edge application clients at the UE have ceased operation.

25. The apparatus of claim 21, wherein the instructions are further executable by the processor to cause the apparatus to:
  determine that the UE has moved outside of an area associated with one or more edge application servers that are serving one or more associated edge application clients at the UE; and
  discontinue transmission of further update indications responsive to determining that the UE has moved outside of the area.

26. The apparatus of claim 21, wherein one or more edge application clients at the UE are automatically deregistered at the edge enabler server when the update indication is not transmitted for a predetermined time period, and
  wherein the edge enabler server releases local caching resources associated with the one or more edge application clients based on the edge application client being relocated, based on the one or more edge application clients being deregistered, or based on the UE discontinuing communications for at least the predetermined time period.

27. An apparatus for wireless communication at an edge enabler server of an edge data network, comprising: a processor, memory coupled with the processor; and instructions stored in the memory and executable by the processor to cause the apparatus to:
  register at least a first edge application client at a first UE for edge application services responsive to establishment of an EDGE-1 connection with the first edge application client, wherein the edge data network provides application services for one or more UE application clients of a plurality of UEs, and the edge application services provide one or more of processing resources or local caching resources for the first UE, and wherein the edge data network is accessed by the UE via a Third Generation Partnership Protocol (3GPP) network;

identify an expiration time associated with the registration of the first edge application client at the first UE;

receive, from the first UE via the 3GPP network, an update indication; and reset the expiration time responsive to receiving the update indication.

28. The apparatus of claim 27, wherein the instructions are further executable by the processor to cause the apparatus to:

monitor for a subsequent update indication from the first UE;

determine that the expiration time has elapsed; and deregister the first edge application client responsive to determining that the expiration time has elapsed.

29. The apparatus of claim 28, wherein the instructions are further executable by the processor to cause the apparatus to:

release local caching resources associated with the first edge application client responsive to deregistering the first edge application client.

30. The apparatus of claim 28, wherein the instructions are further executable by the processor to cause the apparatus to:

remove each of a plurality of edge application clients of the first UE based at least in part on the first UE discontinuing communications for a predetermined time period.

* * * * *